US009626616B2

(12) United States Patent
Richley

(10) Patent No.: US 9,626,616 B2
(45) Date of Patent: Apr. 18, 2017

(54) LOW-PROFILE REAL-TIME LOCATION SYSTEM TAG

(71) Applicant: ZIH Corp., Lincolnshire, IL (US)

(72) Inventor: Edward A. Richley, Gaithersburg, MD (US)

(73) Assignee: ZIH Corp., Lincolnshire, IL (US)

( * ) Notice: Subject to any disclaimer, the term of this patent is extended or adjusted under 35 U.S.C. 154(b) by 0 days.

(21) Appl. No.: 14/732,126

(22) Filed: Jun. 5, 2015

(65) Prior Publication Data

US 2015/0379387 A1    Dec. 31, 2015

Related U.S. Application Data

(60) Provisional application No. 62/008,248, filed on Jun. 5, 2014.

(51) Int. Cl.
  G06K 19/077    (2006.01)
  G06K 19/07     (2006.01)
  (Continued)

(52) U.S. Cl.
  CPC ... G06K 19/07728 (2013.01); G06K 19/0702 (2013.01); G06K 19/0704 (2013.01);
  (Continued)

(58) Field of Classification Search
  CPC ......... G06K 19/07728; G06K 19/0723; G06K 19/0702; G06K 19/0704; G06K 19/0717; H01Q 1/2225; H01Q 1/38
  See application file for complete search history.

(56) References Cited

U.S. PATENT DOCUMENTS

| 3,732,500 A | 5/1973 | Dishal et al. |
| 4,270,145 A | 5/1981 | Farina |

(Continued)

FOREIGN PATENT DOCUMENTS

| EP | 1235077 A2 | 8/2002 |
| EP | 1241616 A2 | 9/2002 |

(Continued)

OTHER PUBLICATIONS

U.S. Appl. No. 14/296,703, filed Jun. 5, 2014; In re: Alonso et al., entitle Method and Apparatus for Associating Radio Frequency Identification Tags with Participants.

(Continued)

*Primary Examiner* — Kristy A Haupt

(57) ABSTRACT

Embodiments of the present invention provide methods for an electrical-mechanical interface associated with a miniature RTLS tag, wherein a mechanical shock absorption comprises a protective antenna enclosure and a potting material to secure the electronics to printed circuit boards. A polyester cup seal prevents the potting material from interacting electrically with an RF antenna. A signal processor is electrically isolated from the antenna by a RF shield or metal can. The cup seal is vacuum-sealed about the RF shield. Flexibility in radiation patterns for the antenna is made possible by eliminating the electrical interactions of the dielectric materials associated with mechanical shock absorption and the antenna. The antenna is approximately circular, with a coaxial center feed through the antenna aperture, and is perturbed by purposeful metal and dielectric adjustments to generate nearly omni-directional radiation patterns in elevation and azimuth.

28 Claims, 26 Drawing Sheets

(51) Int. Cl.
*H01Q 1/22* (2006.01)
*H01Q 1/38* (2006.01)

(52) U.S. Cl.
CPC ..... *G06K 19/0717* (2013.01); *G06K 19/0723* (2013.01); *H01Q 1/2225* (2013.01); *H01Q 1/38* (2013.01)

(56) References Cited

U.S. PATENT DOCUMENTS

| | | |
|---|---|---|
| 5,046,133 A | 9/1991 | Watanabe et al. |
| 5,119,104 A | 6/1992 | Heller |
| 5,469,409 A | 11/1995 | Anderson et al. |
| 5,513,854 A | 5/1996 | Daver |
| 5,645,077 A | 7/1997 | Foxlin |
| 5,699,244 A | 12/1997 | Clark et al. |
| 5,901,172 A | 5/1999 | Fontana et al. |
| 5,920,287 A | 7/1999 | Belcher et al. |
| 5,930,741 A | 7/1999 | Kramer |
| 5,995,046 A | 11/1999 | Belcher et al. |
| 6,028,626 A | 2/2000 | Aviv |
| 6,121,926 A | 9/2000 | Belcher et al. |
| 6,176,837 B1 | 1/2001 | Foxlin |
| 6,204,813 B1 | 3/2001 | Wadell et al. |
| 6,366,242 B1 | 4/2002 | Boyd et al. |
| 6,380,894 B1 | 4/2002 | Boyd et al. |
| 6,593,885 B2 | 7/2003 | Wisherd et al. |
| 6,655,582 B2 | 12/2003 | Wohl et al. |
| 6,710,713 B1 | 3/2004 | Russo |
| 6,812,884 B2 | 11/2004 | Richley et al. |
| 6,836,744 B1 | 12/2004 | Asphahani et al. |
| 6,882,315 B2 | 4/2005 | Richley et al. |
| 7,009,638 B2 | 3/2006 | Gruber et al. |
| 7,190,271 B2 | 3/2007 | Boyd et al. |
| 7,263,133 B1 | 8/2007 | Miao |
| 7,667,604 B2 | 2/2010 | Ebert et al. |
| 7,671,802 B2 | 3/2010 | Walsh et al. |
| 7,710,322 B1 | 5/2010 | Ameti et al. |
| 7,739,076 B1 | 6/2010 | Vock et al. |
| 7,755,541 B2 | 7/2010 | Wisherd et al. |
| 7,899,006 B2 | 3/2011 | Boyd |
| 7,969,348 B2 | 6/2011 | Baker et al. |
| 8,009,727 B2 | 8/2011 | Hui et al. |
| 8,023,917 B2 | 9/2011 | Popescu |
| 8,077,981 B2 | 12/2011 | Elangovan et al. |
| 8,269,835 B2 | 9/2012 | Grigsby |
| 8,279,051 B2 | 10/2012 | Khan |
| 8,289,185 B2 | 10/2012 | Alonso |
| 8,457,392 B2 | 6/2013 | Cavallaro et al. |
| 8,477,046 B2 | 7/2013 | Alonso |
| 8,568,278 B2 | 10/2013 | Riley et al. |
| 8,665,152 B1 | 3/2014 | Kling et al. |
| 8,696,458 B2 | 4/2014 | Foxlin et al. |
| 8,705,671 B2 | 4/2014 | Ameti et al. |
| 8,775,916 B2 | 7/2014 | Pulsipher et al. |
| 8,780,204 B2 | 7/2014 | DeAngelis et al. |
| 8,795,045 B2 | 8/2014 | Sorrells et al. |
| 8,842,002 B2 | 9/2014 | Rado |
| 8,989,880 B2 | 3/2015 | Wohl et al. |
| 9,081,076 B2 | 7/2015 | DeAngelis et al. |
| 9,381,645 B1 | 7/2016 | Yarlagadda et al. |
| 2001/0010541 A1 | 8/2001 | Fernandez et al. |
| 2001/0030625 A1 | 10/2001 | Doles et al. |
| 2002/0004398 A1 | 1/2002 | Ogino et al. |
| 2002/0041284 A1 | 4/2002 | Konishi et al. |
| 2002/0114493 A1 | 8/2002 | McNitt et al. |
| 2002/0116147 A1 | 8/2002 | Vock et al. |
| 2002/0130835 A1 | 9/2002 | Brosnan |
| 2002/0135479 A1 | 9/2002 | Belcher et al. |
| 2003/0090387 A1 | 5/2003 | Lestienne et al. |
| 2003/0095186 A1 | 5/2003 | Aman et al. |
| 2003/0128100 A1 | 7/2003 | Burkhardt et al. |
| 2003/0163287 A1 | 8/2003 | Vock et al. |
| 2003/0227453 A1 | 12/2003 | Beier et al. |
| 2004/0022227 A1 | 2/2004 | Lynch et al. |
| 2004/0062216 A1 | 4/2004 | Nicholls et al. |
| 2004/0108954 A1 | 6/2004 | Richley et al. |
| 2004/0178960 A1* | 9/2004 | Sun .......................... H01Q 1/52 343/700 MS |
| 2004/0249969 A1 | 12/2004 | Price |
| 2004/0260470 A1 | 12/2004 | Rast |
| 2004/0260828 A1 | 12/2004 | Price |
| 2005/0026563 A1 | 2/2005 | Leeper et al. |
| 2005/0031043 A1 | 2/2005 | Paquelet |
| 2005/0059998 A1 | 3/2005 | Norte et al. |
| 2005/0075079 A1 | 4/2005 | Jei et al. |
| 2005/0093976 A1 | 5/2005 | Valleriano |
| 2005/0148281 A1 | 7/2005 | Sanchez-Castro et al. |
| 2005/0207617 A1 | 9/2005 | Sarnoff |
| 2006/0067324 A1 | 3/2006 | Kim |
| 2006/0139167 A1 | 6/2006 | Davie et al. |
| 2006/0164213 A1 | 7/2006 | Burghard et al. |
| 2006/0252476 A1 | 11/2006 | Bahou |
| 2006/0271912 A1 | 11/2006 | Mickle et al. |
| 2006/0281061 A1 | 12/2006 | Hightower et al. |
| 2007/0091292 A1 | 4/2007 | Cho et al. |
| 2007/0176749 A1 | 8/2007 | Boyd et al. |
| 2007/0296723 A1 | 12/2007 | Williams |
| 2008/0065684 A1 | 3/2008 | Zilberman |
| 2008/0106381 A1 | 5/2008 | Adamec et al. |
| 2008/0113787 A1 | 5/2008 | Alderucci |
| 2008/0129825 A1 | 6/2008 | DeAngelis et al. |
| 2008/0140233 A1 | 6/2008 | Seacat |
| 2008/0186231 A1 | 8/2008 | Aljadeff et al. |
| 2008/0204248 A1 | 8/2008 | Winget et al. |
| 2008/0262885 A1 | 10/2008 | Jain et al. |
| 2008/0266131 A1 | 10/2008 | Richardson et al. |
| 2008/0269016 A1 | 10/2008 | Ungari et al. |
| 2008/0281443 A1 | 11/2008 | Rodgers |
| 2008/0285805 A1 | 11/2008 | Luinge et al. |
| 2009/0048044 A1 | 2/2009 | Oleson et al. |
| 2009/0231198 A1 | 9/2009 | Walsh et al. |
| 2010/0026809 A1 | 2/2010 | Curry |
| 2010/0045508 A1 | 2/2010 | Ekbal et al. |
| 2010/0054304 A1 | 3/2010 | Barnes et al. |
| 2010/0060452 A1 | 3/2010 | Schuster et al. |
| 2010/0150117 A1 | 6/2010 | Aweya et al. |
| 2010/0250305 A1 | 9/2010 | Lee et al. |
| 2010/0278386 A1 | 11/2010 | Hoeflinger |
| 2010/0283630 A1 | 11/2010 | Alonso |
| 2010/0328073 A1 | 12/2010 | Nikitin et al. |
| 2011/0025847 A1 | 2/2011 | Park et al. |
| 2011/0054782 A1 | 3/2011 | Kaahui et al. |
| 2011/0063114 A1 | 3/2011 | Ikoyan |
| 2011/0064023 A1 | 3/2011 | Yamamoto et al. |
| 2011/0084806 A1 | 4/2011 | Perkins et al. |
| 2011/0134240 A1 | 6/2011 | Anderson et al. |
| 2011/0140970 A1 | 6/2011 | Fukagawa et al. |
| 2011/0169959 A1 | 7/2011 | Deangelis et al. |
| 2011/0261195 A1 | 10/2011 | Martin et al. |
| 2011/0300905 A1 | 12/2011 | Levi |
| 2011/0320322 A1 | 12/2011 | Roslak et al. |
| 2012/0014278 A1 | 1/2012 | Ameti et al. |
| 2012/0024516 A1 | 2/2012 | Bhadurt et al. |
| 2012/0057634 A1 | 3/2012 | Shi et al. |
| 2012/0057640 A1 | 3/2012 | Shi et al. |
| 2012/0065483 A1 | 3/2012 | Chung et al. |
| 2012/0081531 A1 | 4/2012 | DeAngelis et al. |
| 2012/0112904 A1 | 5/2012 | Nagy et al. |
| 2012/0126973 A1 | 5/2012 | DeAngelis et al. |
| 2012/0139708 A1 | 6/2012 | Paradiso et al. |
| 2012/0184878 A1 | 7/2012 | Najafi et al. |
| 2012/0212505 A1 | 8/2012 | Burroughs et al. |
| 2012/0218301 A1 | 8/2012 | Miller |
| 2012/0225676 A1 | 9/2012 | Boyd et al. |
| 2012/0231739 A1 | 9/2012 | Chen et al. |
| 2012/0246795 A1 | 10/2012 | Scheffler et al. |
| 2012/0256745 A1 | 10/2012 | Piett et al. |
| 2012/0268239 A1 | 10/2012 | Ljung et al. |
| 2013/0003860 A1 | 1/2013 | Sasai et al. |
| 2013/0021142 A1 | 1/2013 | Matsui et al. |
| 2013/0021206 A1 | 1/2013 | Hach et al. |
| 2013/0041590 A1 | 2/2013 | Burich et al. |
| 2013/0066448 A1 | 3/2013 | Alonso |
| 2013/0076645 A1 | 3/2013 | Anantha et al. |

(56) References Cited

U.S. PATENT DOCUMENTS

| | | |
|---|---|---|
| 2013/0096704 A1 | 4/2013 | Case |
| 2013/0115904 A1 | 5/2013 | Kapoor et al. |
| 2013/0138386 A1 | 5/2013 | Jain et al. |
| 2013/0142384 A1 | 6/2013 | Ofek |
| 2013/0257598 A1 | 10/2013 | Kawaguchi et al. |
| 2013/0339156 A1 | 12/2013 | Sanjay et al. |
| 2014/0055588 A1 | 2/2014 | Bangera et al. |
| 2014/0145828 A1 | 5/2014 | Bassan-Eskenazi |
| 2014/0156036 A1 | 6/2014 | Huang |
| 2014/0170607 A1 | 6/2014 | Hsiao et al. |
| 2014/0221137 A1 | 8/2014 | Krysiak et al. |
| 2014/0320660 A1 | 10/2014 | DeAngelis et al. |
| 2014/0361875 A1 | 12/2014 | O'Hagan et al. |
| 2014/0361906 A1 | 12/2014 | Hughes et al. |
| 2014/0364141 A1 | 12/2014 | O'Hagan et al. |
| 2014/0365415 A1 | 12/2014 | Stelfox et al. |
| 2015/0002272 A1 | 1/2015 | Alonso et al. |
| 2015/0057981 A1 | 2/2015 | Gross |
| 2015/0085111 A1 | 3/2015 | Lavery |
| 2015/0097653 A1 | 4/2015 | Gibbs et al. |
| 2015/0358852 A1 | 12/2015 | Richley et al. |
| 2015/0360133 A1 | 12/2015 | MacCallum et al. |
| 2015/0375041 A1 | 12/2015 | Richley et al. |
| 2015/0375083 A1 | 12/2015 | Stelfox et al. |
| 2015/0379387 A1 | 12/2015 | Richley |
| 2016/0097837 A1 | 4/2016 | Richley et al. |

FOREIGN PATENT DOCUMENTS

| | | | |
|---|---|---|---|
| EP | 1253438 A2 | 10/2002 | |
| EP | 1503513 A1 | 2/2005 | |
| EP | 2474939 A1 | 11/2012 | |
| WO | WO-9805977 A1 | 2/1998 | |
| WO | WO 99/61936 A1 | 12/1999 | |
| WO | WO 01008417 | 2/2001 | |
| WO | WO 2006/022548 | 3/2006 | |
| WO | WO-2010/083943 A1 | 7/2010 | |
| WO | WO 2015/051813 A1 | 4/2014 | |
| WO | WO 2014197600 | 12/2014 | |
| WO | WO 2014197600 A1 * | 12/2014 | ............ H04W 4/008 |

OTHER PUBLICATIONS

U.S. Appl. No. 61/895,548, filed Oct. 25, 2013, In re: Alonso et al., entitled "Method, Apparatus, and Computer Program Product for Collecting Sporting Event Data Based on Real Time Data for Proximity and Movement of Objects".
International Search Report and Written Opinion for International Application No. PCT/IB2015/059264 dated Feb. 10, 2016.
Jinyun Zhang et al., "UWB Systems for Wireless Sensor Networks", Proceedings of the IEEE, IEEE. New York, US, vol. 97, No. 2, Feb. 1, 2009 (Feb. 1, 2009), pp. 313-331.
International Search Report and Written Opinion for International Application No. PCT/US2015/034267 dated Sep. 25, 2015.
International Search Report and Written Opinion for International Application No. PCT/IB2015/054103 dated Aug. 14, 2015.
Cheong, P. et al., "Synchronization, TOA and Position Estimation for Low-Complexity LDR UWB Devices", Ultra-Wideband, 2005 IEEE International Conference, Zurich, Switzerland Sep. 5-8, 2005, Piscataway, NJ, USA, IEEE, Sep. 5, 2005, pages.
International Search Report and Written Opinion for International Application No. PCT/IB2015/054213 dated Aug. 6, 2015.
Wang, Y. et al., "An Algorithmic and Systematic Approach from Improving Robustness of TOA-Based Localization", 2013 IEEE 10th International Conference on High Performance Computing and Communications & 2013 IEEE, Nov. 13, 2013, pages.
Guevnc, I. et al., "A Survey on TOA Based Wireless Localization and NLOA Mitigation Techniques", IEEE Communications Survey, IEEE, New York, NY, US, vol. 11, No. 3, Oct. 1, 2009, pp. 107-124.

International Search Report and Written Opinion for International Application PCT/IB2015/054102 dated Nov. 4, 2015.
"Seattleite wins top prize in Microsoft's Super Bowl tech Contest", San Francisco AP, Komonews.com, Feb. 6, 2016. <http://komonews.com/news/local/seattleite-wins-top-prize-in-microsofts-super-bowl-tech-contest>.
Bahle et al., "I See You: How to Improve Wearable Activity Recognition by Leveraging Information from Environmental Cameras," Pervasive Computing and Communications Workshops, IEEE International Conference, (Mar. 18-22, 2013).
Teixeria et al., "Tasking Networked CCTV Cameras and Mobile Phones to Identify and Localize Multiple People," Ubicomp '10 Proceedings of the 12th ACM International Conference on Ubiquitous Computing, pp. 213-222 (Sep. 26-29, 2010).
Complaint before the United States District Court of Massachusetts, Civil Action No. 1:15-cv-12297, *Lynx System Developers, Inc. et al.* v. *Zebra Enterprise Solutions Corporation et al.*, filed Mar. 23, 2016.
Defendant's Answer to Complaint before the United States District Court of Massachusetts, Civil Action No. 1:15-cv-12297, *Lynx System Developers, Inc. et al.* v. *Zebra Enterprise Solutions Corporation et al.*, filed Apr. 6, 2016.
Complaint before the United States District Court of Massachusetts, Civil Action No. 1:15-cv-12297, *Lynx System Developers, Inc. et al.* v. *Zebra Enterprise Solutions Corporation et al.*, filed Jun. 10, 2015.
Swedberg, Claire, "USDA Researchers Develop System to Track Livestock Feeding Behavior Unobtrusively", RFID Journal, Jul. 18, 2013.
International Search Report and Written Opinion from International Application No. PCT/US2014/041062 dated Oct. 1, 2014.
International Search Report and Written Opinion from International Application No. PCT/US2014/040947 dated Oct. 9, 2014.
Fontana, R.J., Richley, E., Barney, J., "Commercialization of an Ultra Wideband Precision Asset Location System," 2003 *IEEE Conference on Ultra Wideband Systems and Technologies*, Nov. 16-19, 2003.
Gueziec, A., "Tracking Pitches for Broadcast Television," *Computer*, Aug. 7, 2002.
CattleLog Pro, *eMerge Interactive, Inc.*, Sebastian, FL, 2004.
Marchant, J., Secure Animal Identification and Source Verification, *JM Communications*, UK, 2002.
"A Guide to Using NLIS Approved Ear Tags and Rumen Boluses," National Livestock Identification Scheme, *Meat & Livestock Australia Limited*, North Sydney, Australia, May 2003.
King, L., "NAIS Cattle ID Pilot Projects Not Needed, Since Proven Advanced Technology Already Exists," *ScoringSystem, Inc.*, Sarasota, FL, Dec. 27, 2005. (www.prweb.com/releases/2005/12prweb325888.htm).
"RFID in the Australian Meat and Livestock Industry," Allflex Australia Pty Ltd,Capalaba, QLD (AU), *Data Capture Suppliers Guide*, 2003-2004.
International Search Report and Written Opinion from International Application No. PCT/US2014/040881 dated Nov. 4, 2014.
Swedberg, C., "N.J. Company Seeks to Market Passive Sensor RFID Tags," *RFID Journal*, Jun. 20, 2013.
International Search Report and Written Opinion from International Application No. PCT/US2014/040940 dated Dec. 17, 2014.
CattleLog Pro, *Merge Interactive, Inc.*, Sebastian, FL, 2004.
Invention to Pay Additional Fees/Partial International Search Report for PCT/IB2015/054099 dated Oct. 6, 2015.
International Search Report and Written Opinion for International Application No. PCT/IB2015/054099 dated Dec. 9, 2015.
International Search Report for International Application No. PCT/US2014/053647 dated Dec. 19, 2014.
International Search Report and Written Opinion for International Application No. PCT/US2016/035614 dated Sep. 15, 2016.
Zhu et al., "A Real-Time Articulated Human Motion Tracking Using Tri-Axis Inertial/Magnetic Sensors Package," IEEE Transactions on Neural Systems and Rehabilitation Engineering, vol. 12, No. 2, Jun. 2004, pp. 295-302.

* cited by examiner

LOW-PROFILE REAL-TIME LOCATION SYSTEM TAG

CROSS-REFERENCE TO RELATED APPLICATION

This application claims the benefit of U.S. Provisional Application No. 62/008,248, filed Jun. 5, 2014, the entire contents of which are incorporated herein by reference.

FIELD

Embodiments discussed herein are related to radio frequency locating and, more particularly, to systems, methods, apparatuses, computer readable media, and other means for target location using real-time location system tags.

BACKGROUND

A number of deficiencies and problems associated with the electrical-mechanical interface of real time locating system (RTLS) tag transmitters, particularly related to the antenna interface are identified herein. Through applied effort, ingenuity, and innovation, exemplary solutions these identified problems are embodied by the present invention, which is described in detail below.

BRIEF SUMMARY OF THE INVENTION

Systems, methods, apparatuses, and computer readable media are disclosed for providing an electrical-mechanical interface for miniature and impact resistant RTLS tags in a multiple receiver system. A brief summary is provided in the following.

In some example embodiments, a real-time location system is configured to calculate location information for a tag based on data transmitted by the tag and received by at least one receiver, the tag comprising a signal processor configured to generate blink data, the blink data comprising a series of ultra wide band (UWB) pulses and data, and a transmitter and compact high bandwidth antenna configured to transmit the blink data, wherein the transmitter is electrically isolated from the compact high bandwidth antenna, and the signal processor, transmitter, and compact high bandwidth antenna are mechanically isolated from the environment.

In some example embodiments, the electrical isolation comprises a radio frequency (RF) shield (e.g., a metal can) to prevent parasitic radiation from the transmitter electronics having an adverse effect on the antenna. In some example embodiments, the tag is mechanically isolated from the environment and further comprises a hard, tough plastic housing. The system is further mechanically isolated from the environment by a potting material to affix and protect the printed circuit board (PCB) assembly. The potting material comprises an epoxy in some embodiments.

Further, the tag comprises, in some example embodiments, a cup seal forming a protective layer to control a flow of the potting material. The cup seal comprises a polyester or polyethylene material in some embodiments. The cup seal seals about the RF shield and/or the transmitter electronics, in some example embodiments.

The real-time location system configured to calculate location information for a tag based on data transmitted by the tag and received by at least one receiver is comprised, in some example embodiments, of: a tag retaining unit, wherein a band and casing unit is configured to releasably retain the tag, the band and casing being sized to be receivable in a void defined by protective equipment, and a location tag, wherein the location tag is configured to generate blink data comprising a series of UWB pulses and data usable to determine a tag location. The band and casing unit is elastic in some embodiments.

Further, in some example embodiments, a method for fabricating a miniature and impact resistant RTLS tag, comprises: tuning a compact high bandwidth antenna, sealing a cup seal about a RF shield to one of the at least one PCBs to control a flow of potting material, encasing the miniature and impact resistant RTLS tag with a shock absorbing material, and spreading the potting material to secure a printed circuit board assembly comprising the at least one PCB and the compact high bandwidth antenna, whereby the tuning is unaffected by the encasing, the spreading, and the sealing.

In some example embodiments, the encasing comprises a hard, tough protective housing comprised of a plastic, polymer, or the like. In some example embodiments, the housing can absorb a shock greater than 100-200 g's. The housing may comprise a molding. The potting material comprises an epoxy in some embodiments.

In some example embodiments, the RF shield is form-fitted over the transmitter electronics. The RF shield may be a metal can which may be a rectangular enclosure, in some embodiments. In some embodiments, the enclosing with the RF shield comprises a grounding of the RF shield.

In some example embodiments, the sealing of the cup seal to control the flow of the potting material comprises preventing the potting material from leaking under the cup seal.

In some example embodiments, the tuning comprises an adding of a conductive element to the PCB. The conductive element may be copper in some example embodiments. The conductive element may be grounded in some example embodiments. Further, in some example embodiments, the tuning may comprise an adding of a dielectric element to the PCB.

In some example embodiments, the encasing, the encasing, and the spreading comprise a mechanical isolation for the miniature and impact resistant RTLS tag. In some example embodiments, the shielding and the enclosing comprise an electrical isolation for the miniature and impact resistant RTLS tag. In some example embodiments, the sealing comprises an electrical-mechanical isolation for the miniature and impact resistant RTLS tag. The tuning is unaffected by the encasing, the spreading, the enclosing, and the sealing, which comprises a predictable distribution of dielectric mechanical and electrical isolators that do not effect a change in a radiation pattern of the antenna.

In some example embodiments, a miniature and impact resistant RTLS tag comprises the following: a compact high bandwidth antenna having a shock absorbing material, at least one printed circuit board at least partially covered by a potting material, a signal processor with a RF shield for radio frequency shielding, and a cup seal about the RF shield sealed to the PCB so as to control a flow of the potting material.

In one embodiment, a miniature and impact resistant real-time location system tag is provided comprising: a signal processor configured to generate blink data, the blink data comprising a series of ultra wide band pulses and data; a dielectric antenna support defining an antenna cavity; a compact high bandwidth antenna seated within the antenna cavity and disposed in electrical communication with the signal processor, the patch antenna configured to transmit the blink data; a radio frequency shield configured to prevent parasitic radiation affecting antenna transmissions; and a mechanical isolator configured to protect a plurality of printed circuit board devices.

In some example embodiments, the radio frequency shield is structured to cover transmitter electronics associated with a printed circuit board. In some example embodiments, the radio frequency shield defines a metal can structured to cover transmitter electronics associated with a printed circuit board.

In some example embodiments, the miniature and impact resistant real-time location system tag further comprises a polymer support configured to enclose and protect the compact high bandwidth antenna.

In some example embodiments, the mechanical isolator comprises a potting material configured to affix a tag assembly within a protective housing.

In some example embodiments, the miniature and impact resistant real-time location system tag further comprises a cup seal configured to prevent the mechanical isolator from entering the radio frequency shield, wherein the mechanical isolator comprises a potting material. In some example embodiments, the cup seal is structured to control a flow of the potting material. In some example embodiments, the cup seal comprises a polyester material. In some example embodiments, the cup seal seals to a printed circuit board over the radio frequency shield.

In some example embodiments, the protective housing is structured as an oblong protective housing configured to house an oblong tag assembly, the oblong tag assembly comprising an oblong printed circuit board and the compact high bandwidth antenna.

In one embodiment, a method for fabricating a miniature and impact resistant real-time location system tag is provided comprising: sealing a cup seal to at least one printed circuit board, the cup seal structured to be sealed over a radio frequency shield and to prevent potting material from entering the radio frequency shield, wherein the at least one printed circuit board is associated with a signal processor, transmitter electronics, and an antenna; encasing a tag assembly comprising the at least one printed circuit board and the antenna within a shock absorbing material; depositing the potting material to secure the tag assembly within the shock absorbing material; and tuning the antenna, whereby the tuning is unaffected by the sealing, the encasing, or the depositing.

In some example embodiments, the shock absorbing material comprises a hard, tough housing. In some example embodiments, the housing can absorb a shock greater than 100-200 g's.

In some example embodiments, the sealing, the encasing, and the depositing results in a predictable distribution of dielectric mechanical and electrical isolators which do not effect a change in a radiation pattern of the antenna.

In some example embodiments, the antenna is integrated with the at least one printed circuit board. In some example embodiments, the radio frequency shield is structured to shield the antenna from parasitic radio frequency radiation generated by the transmitter electronics. In some example embodiments, the tuning comprises adjusting a radiation pattern of the antenna.

In one embodiment, a miniature and impact resistant real-time location system location tag is provided comprising: a signal processor configured to generate blink data, the blink data comprising a series of ultra wide band pulses and data; a compact high bandwidth antenna configured to transmit the blink data in association with transmitter electronics; a radio frequency shield structured to prevent parasitic radiation from affecting antenna transmissions; at least one printed circuit board, wherein the at least one printed circuit board is associated with a signal processor and the antenna, wherein the at least one printed circuit board and the antenna comprise a tag assembly; a cup seal sealed around the radio frequency shield to prevent potting material from entering the radio frequency shield; and a shock absorbing material encasing the tag assembly wherein the potting material secures the tag assembly within the shock absorbing material.

In some example embodiments, the shock absorbing material comprises a hard, tough protective housing. In some example embodiments, the protective housing can absorb a shock greater than 100-200 g's. In some example embodiments, the potting material comprises an epoxy.

In some example embodiments, the radio frequency shield comprises a metal can form-fitted to cover at least the transmitter electronics. In some example embodiments, the metal can is a rectangular enclosure. In some example embodiments, the sealing the cup seal around the radio frequency shield comprises sealing the cup seal to the at least one printed circuit board.

In some example embodiments, the antenna is tuned by adding a conductive element to the at least one printed circuit board. In some example embodiments, the conductive element is grounded. In some example embodiments, the antenna is tuned by adding a dielectric element to the printed circuit board.

In some example embodiments, the shock absorbing material and the potting material provide mechanical isolation for tag assembly. In some example embodiments, the radio frequency shield provides electrical isolation for the transmitter electronics. In some example embodiments, the cup seal provides electrical-mechanical isolation for the real-time location system tag.

In some example embodiments, the sealing, the encasing, and the securing result in a predictable distribution of dielectric mechanical and electrical isolators which do not effect a change in a radiation pattern of the compact high bandwidth antenna.

In some example embodiments, the compact high bandwidth antenna is integrated with the at least one printed circuit board. In some example embodiments, the compact high bandwidth antenna is tuned by adjusting a radiation pattern of the compact high bandwidth antenna.

In some example embodiments, the protective housing is structured as an oblong protective housing configured to house an oblong tag assembly, the oblong tag assembly comprising an oblong printed circuit board and the compact high bandwidth antenna.

In one embodiment, a miniature and impact resistant real-time location system location tag is provided comprising: at least one printed circuit board comprising a signal processor and transmitter electronics; the signal processor configured to generate blink data, the blink data comprising a series of ultra wide band pulses and data; a compact high bandwidth antenna configured to transmit the blink data in association with the transmitter electronics, wherein the compact high bandwidth antenna is associated with the at least one printed circuit board; wherein the compact high bandwidth antenna and the at least one printed circuit board comprise a tag assembly; and a shock absorbing housing encasing the tag assembly.

In some example embodiments, the miniature and impact resistant real-time location system tag further comprises potting material structured to secure the tag assembly within the shock absorbing housing.

In some example embodiments, the at least one printed circuit board comprises a plurality of printed circuit board layers and the transmitter electronics comprises a filter, the miniature and impact resistant real-time location system tag further comprising the filter being imbedded within the plurality of printed circuit board layers to prevent parasitic radiation from affecting an antenna radiation pattern. In some example embodiments, the miniature and impact resistant real-time location system tag further comprises a plurality of printed circuit board planes embedded in one or more of the plurality of printed circuit board layers to further prevent parasitic radiation from affecting an antenna radiation pattern.

In some example embodiments, the tag assembly comprises a circular tag assembly structured to improve an antenna radiation pattern produced by the miniature and impact resistant real-time location system tag. In some example embodiments, the improvement to the antenna radiation pattern comprises producing a more uniform antenna radiation pattern.

In some example embodiments, the miniature and impact resistant real-time location system tag further comprises a cup seal structured to seal over the transmitter electronics comprised on a top layer of the at least one printed circuit board to prevent potting material from affecting the transmitter electronics. In some example embodiments, the cup seal is further structured to seal over an antenna aperture configured in the at least one printed circuit board.

In some example embodiments, the shock absorbing housing is structured as a circular protective housing configured to house the circular tag assembly.

BRIEF DESCRIPTION OF THE SEVERAL VIEWS OF THE DRAWINGS

Figure 1A:
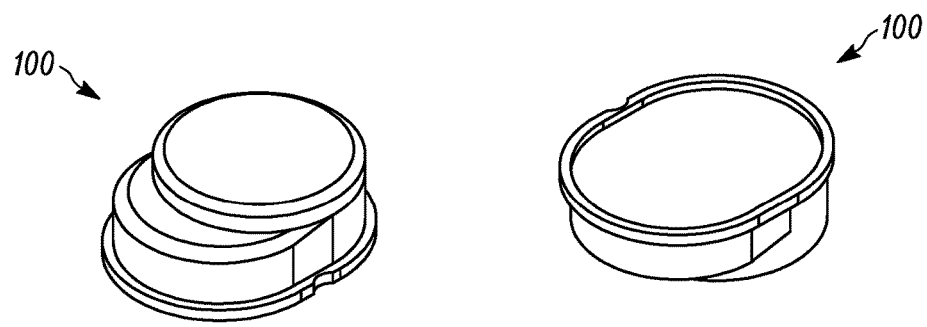
Figure 1B:
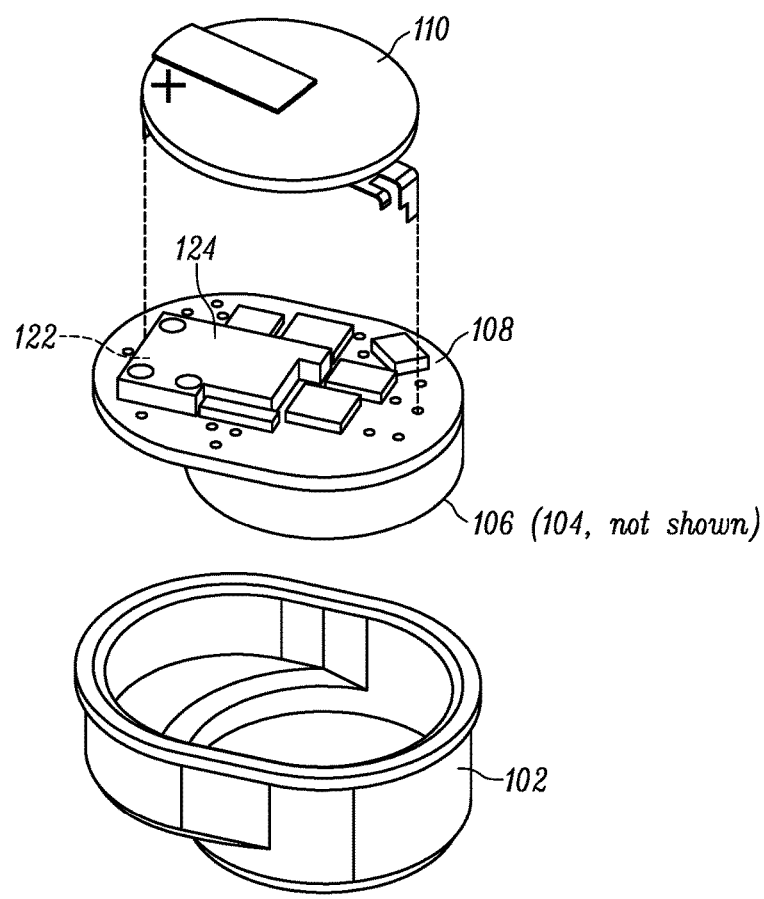
Figure 1C:
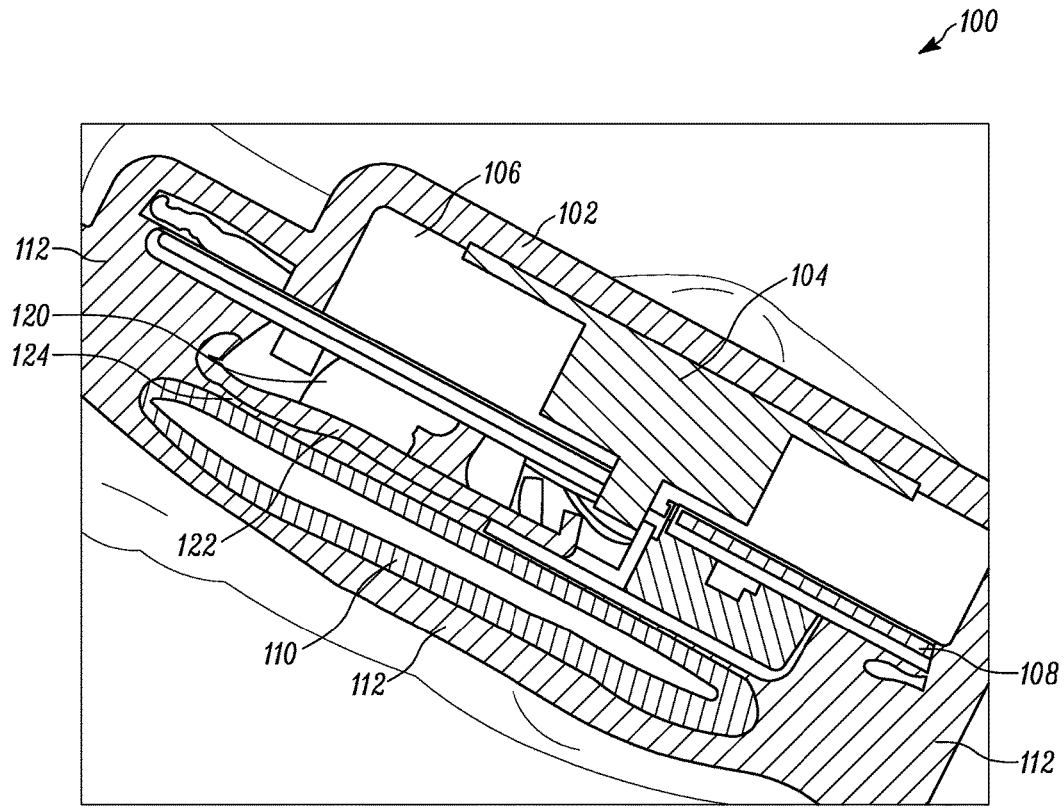
Figure 1D:
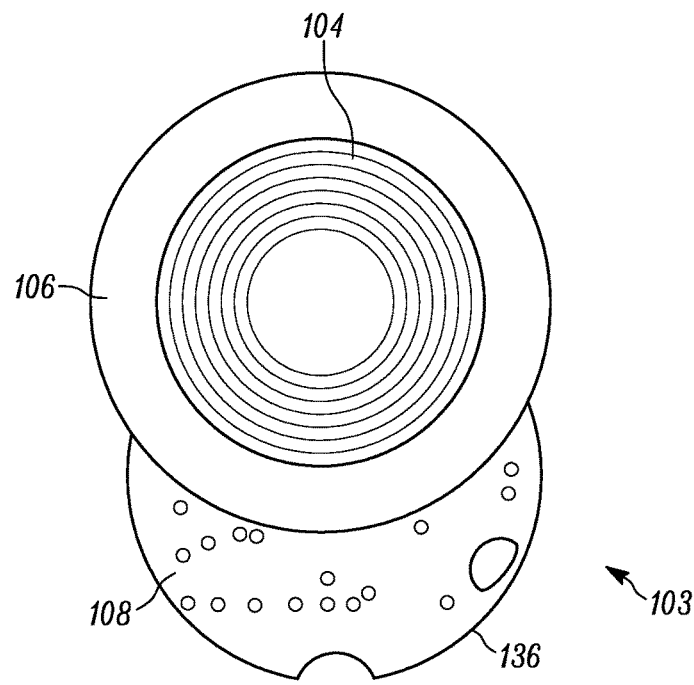
Figure 1E:
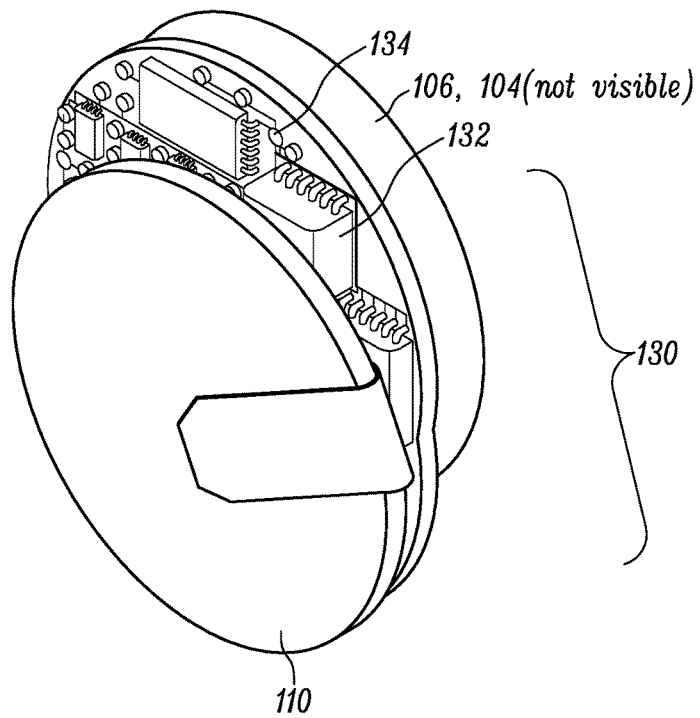
Figure 1F:
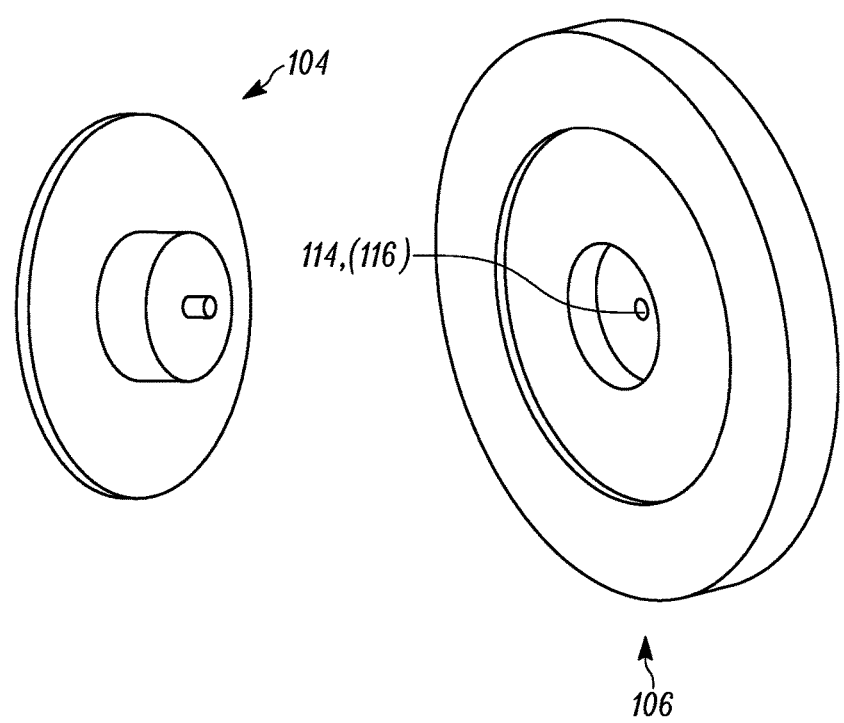
Figure 1G:
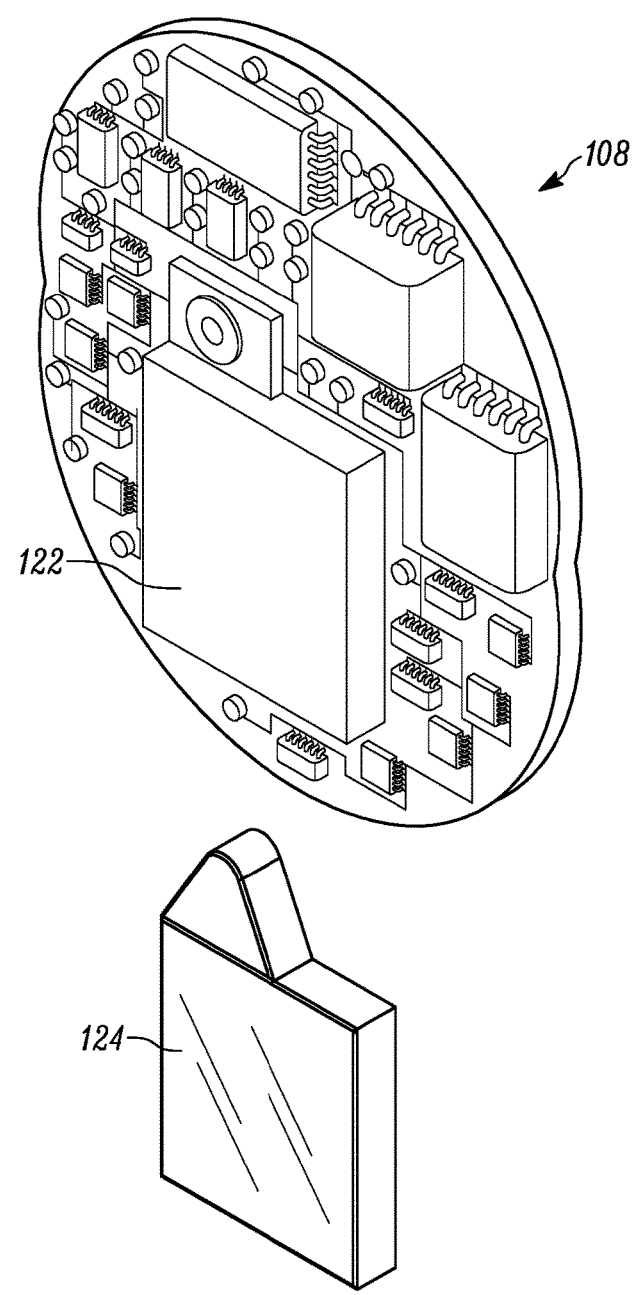
Figure 1H:
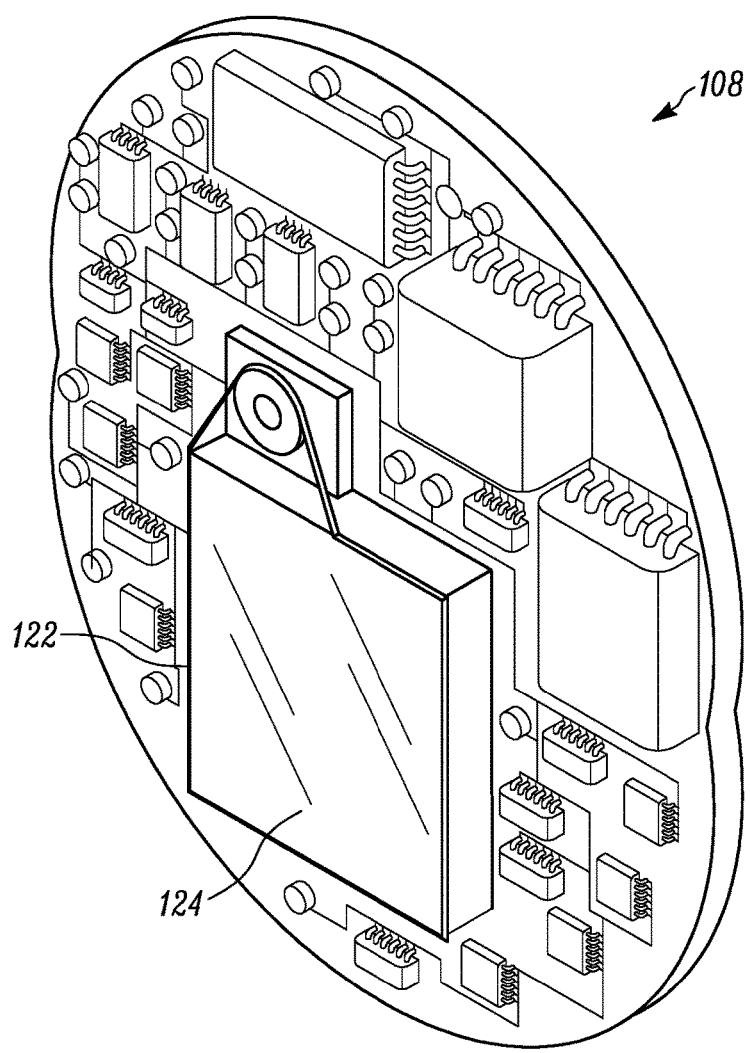
Figure 1I:
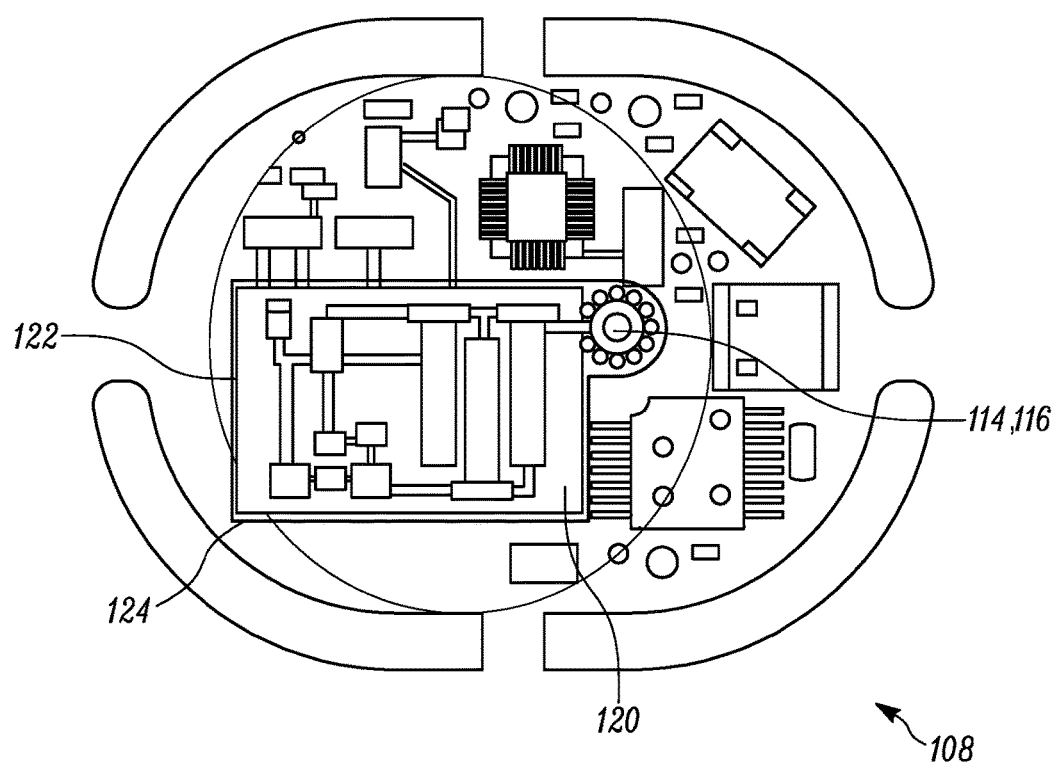
Figure 2A:
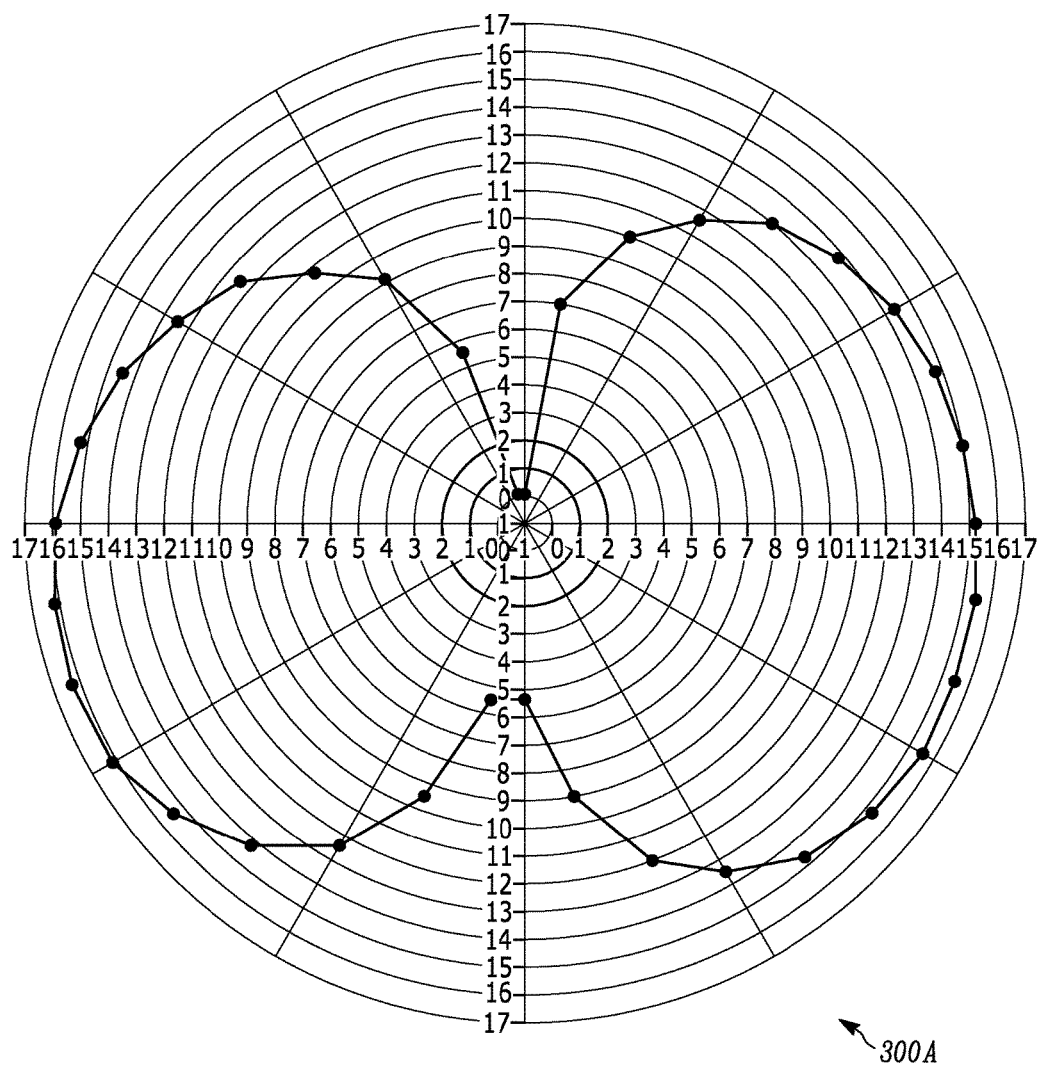
Figure 2B:
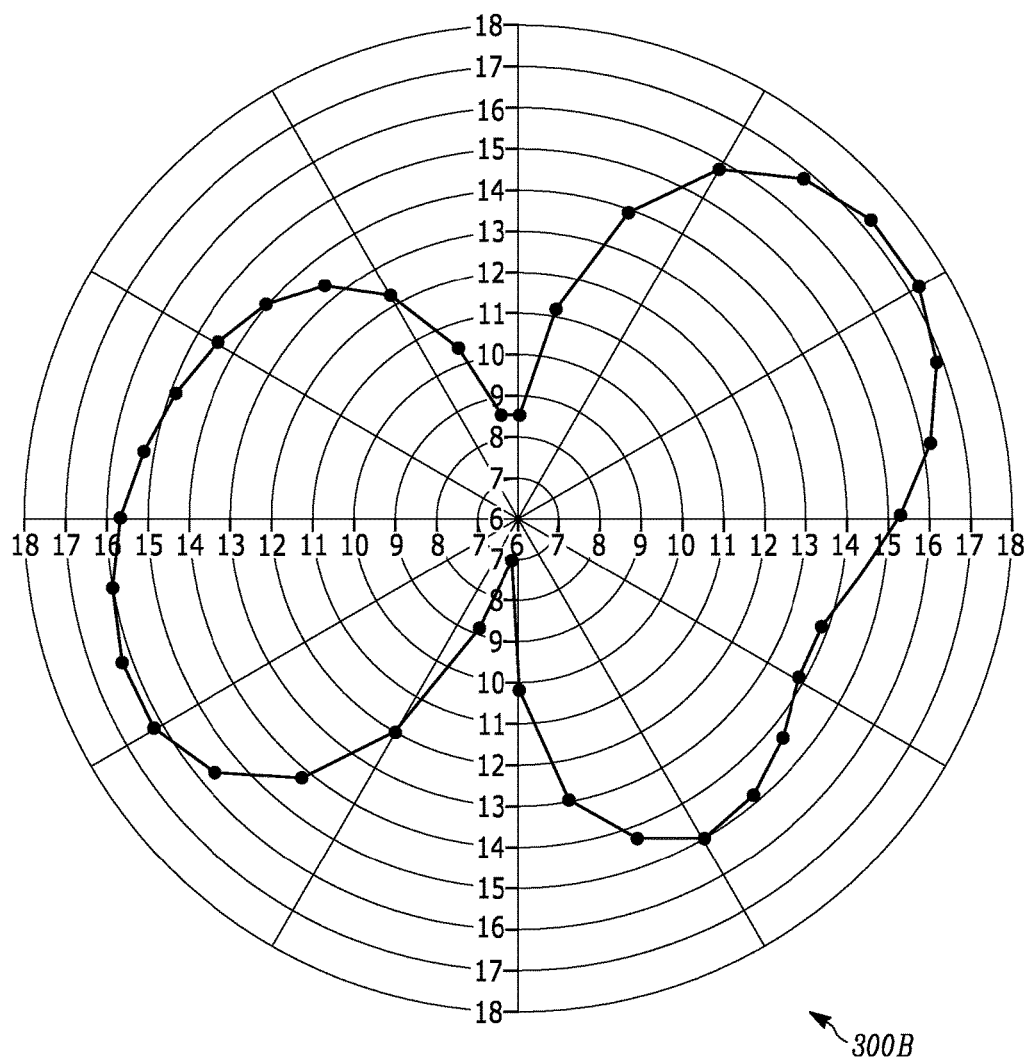
Figure 2C:
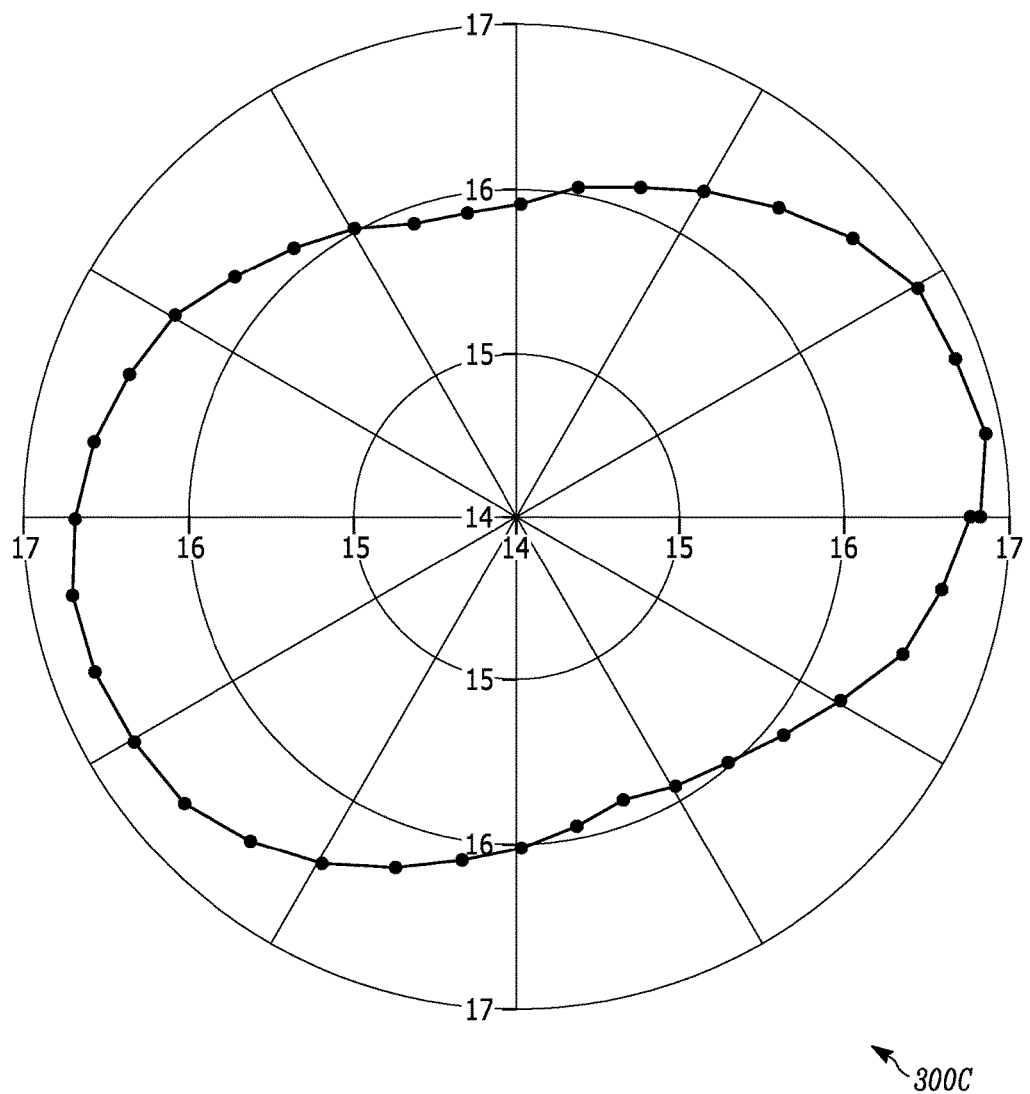
Figure 3A:
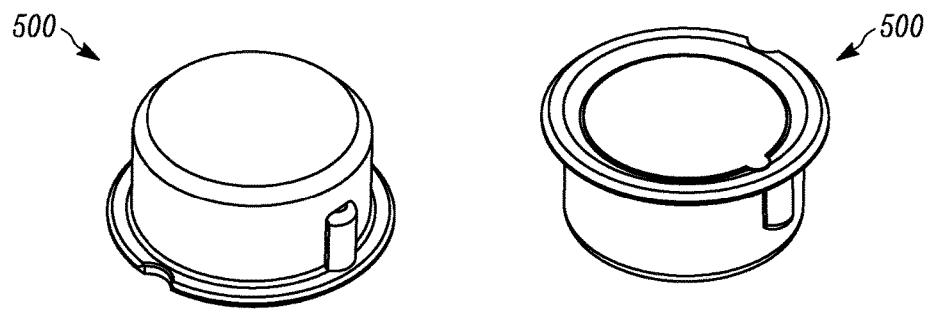
Figure 3B:
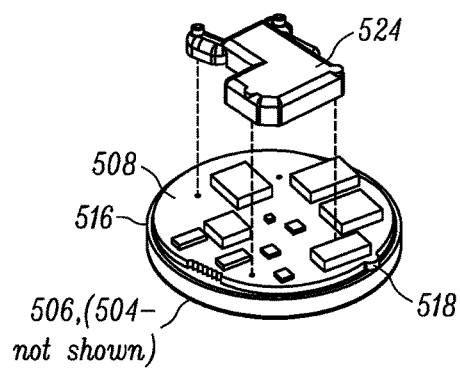
Figure 3C:
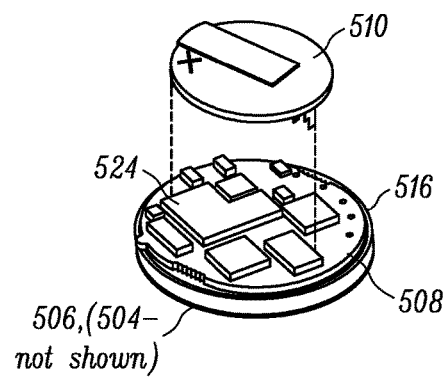
Figure 3D:
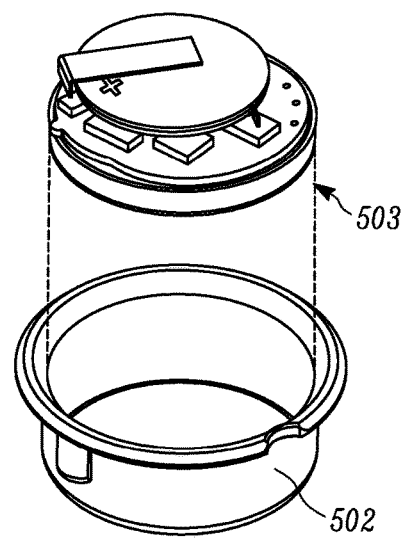
Figure 3E:
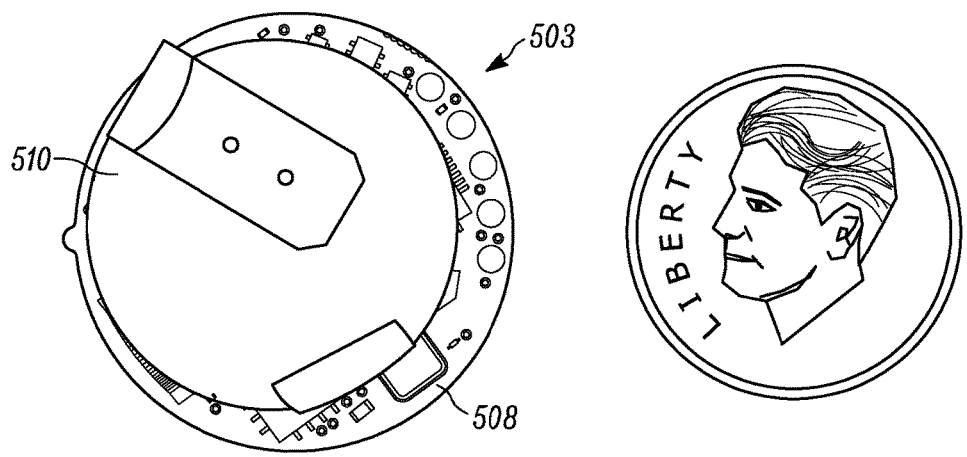
Figure 3F:
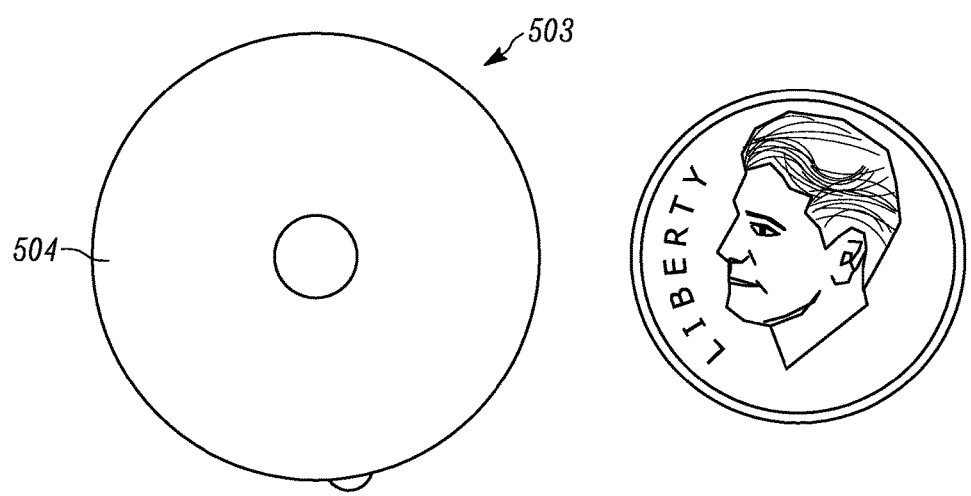
Figure 3G:
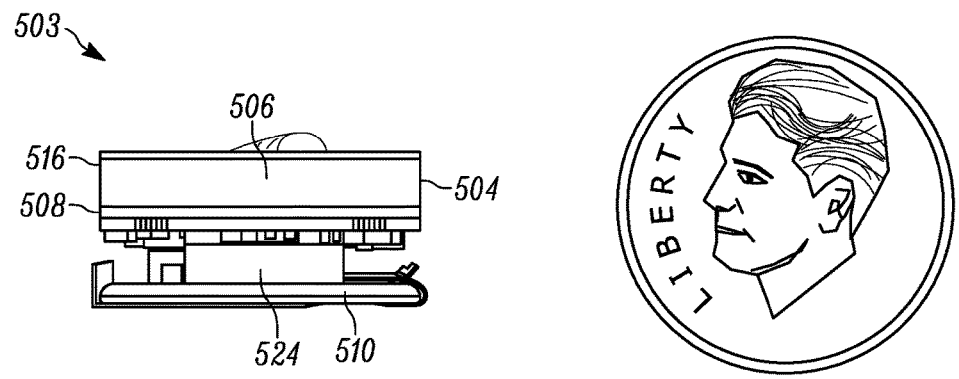
Figure 3H:
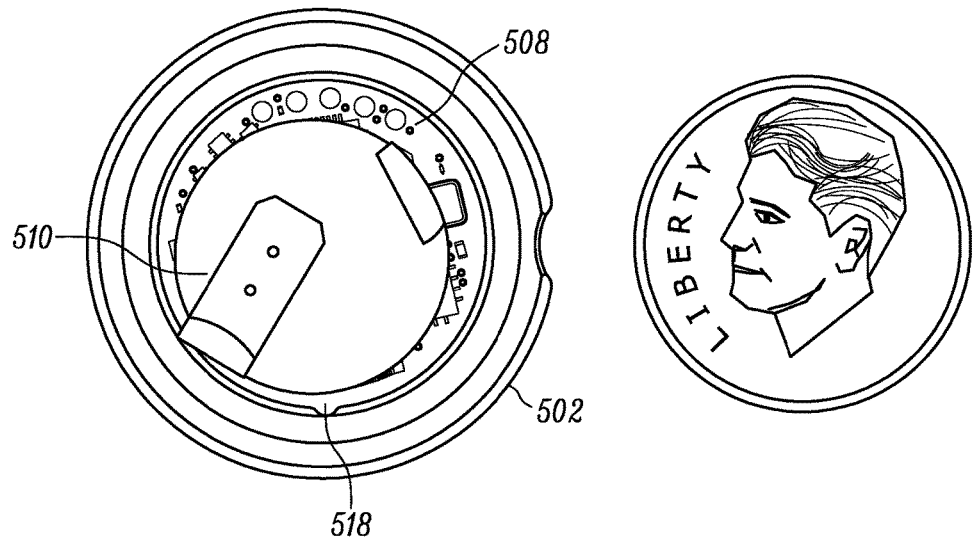
Figure 3I:
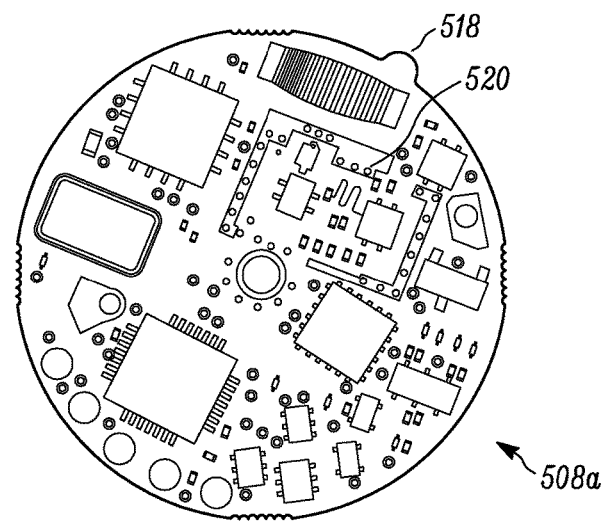
Figure 3J:
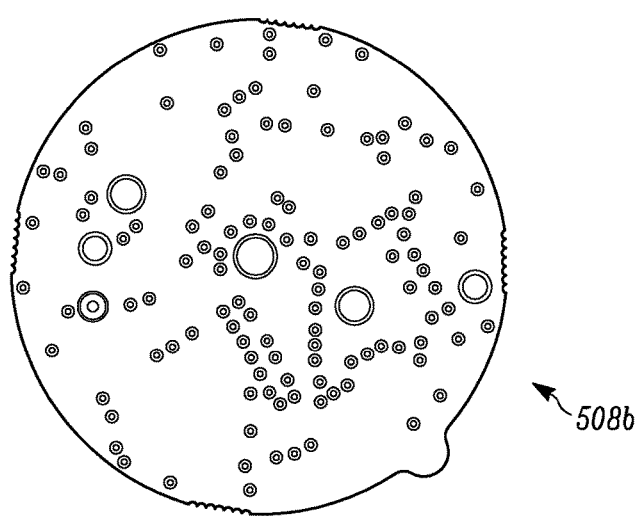
Figure 3K:
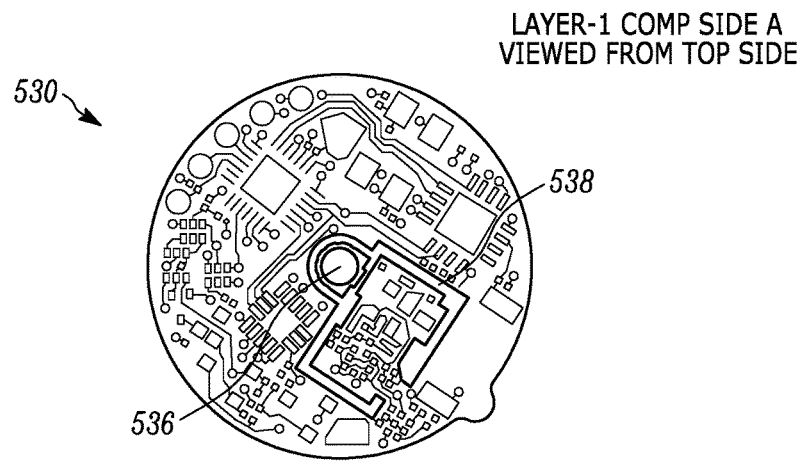
Figure 3L:
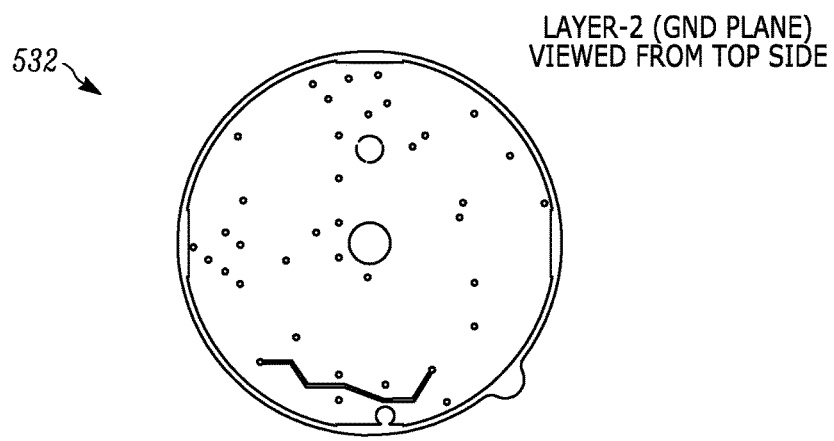
Figure 3M:
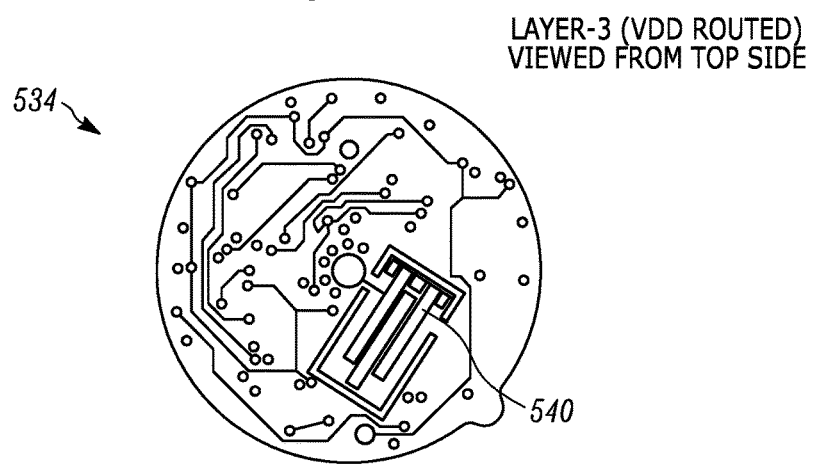
Figure 3N:
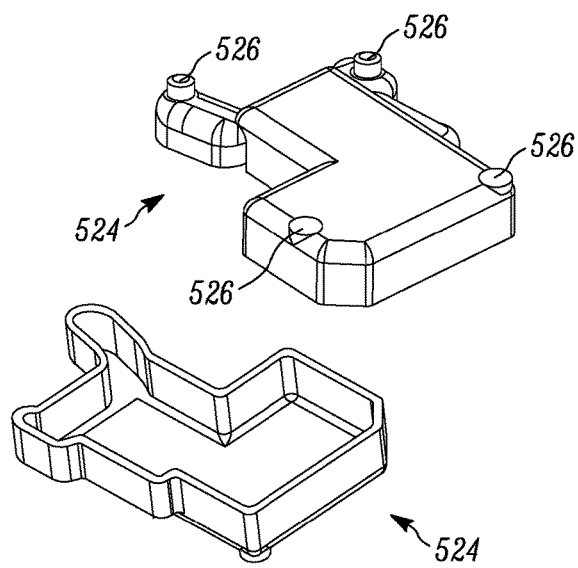
Figure 3O:
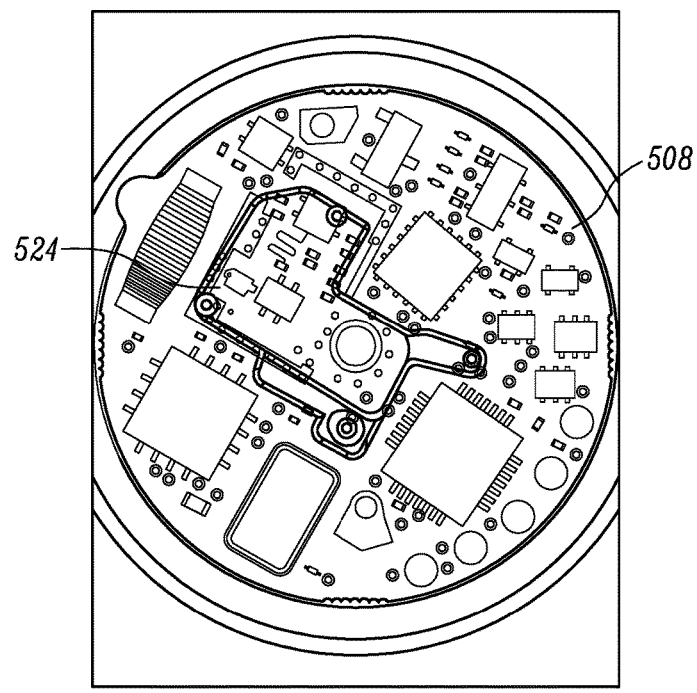
Figure 3P:
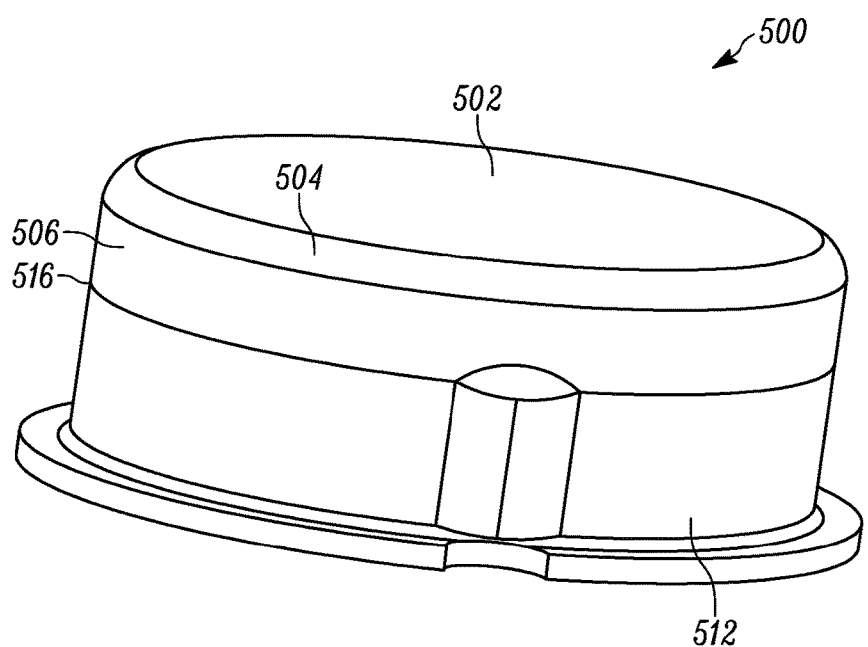
Figure 3Q:
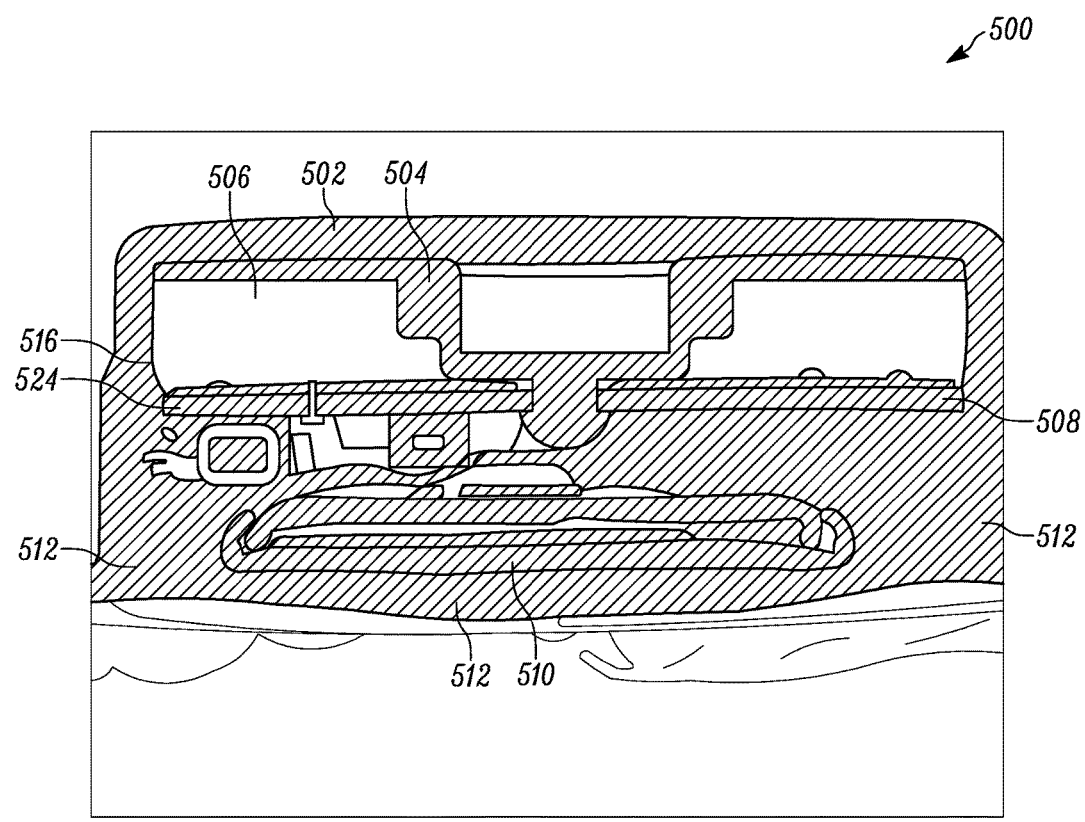
Figure 3R:
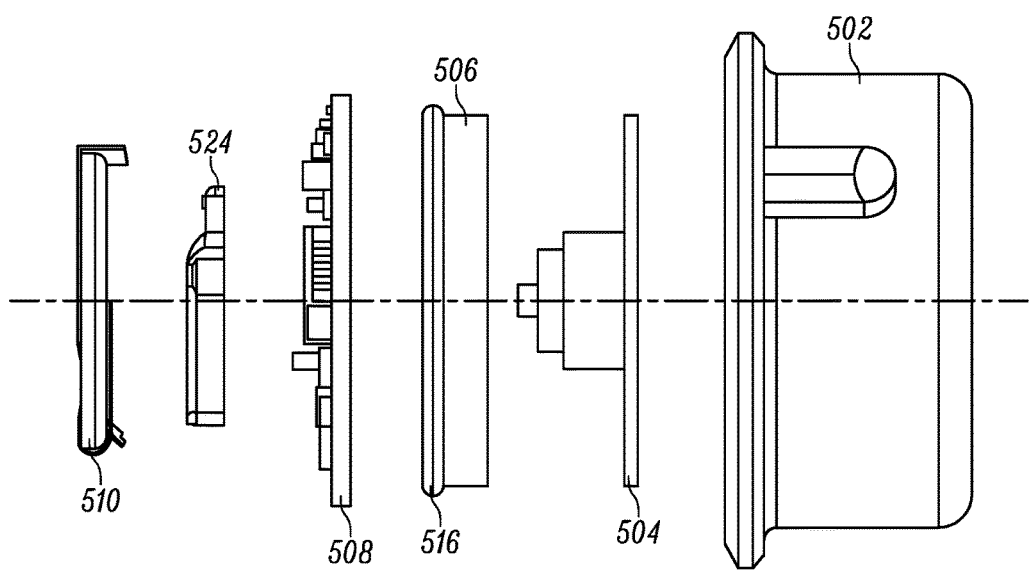
Figure 4A:
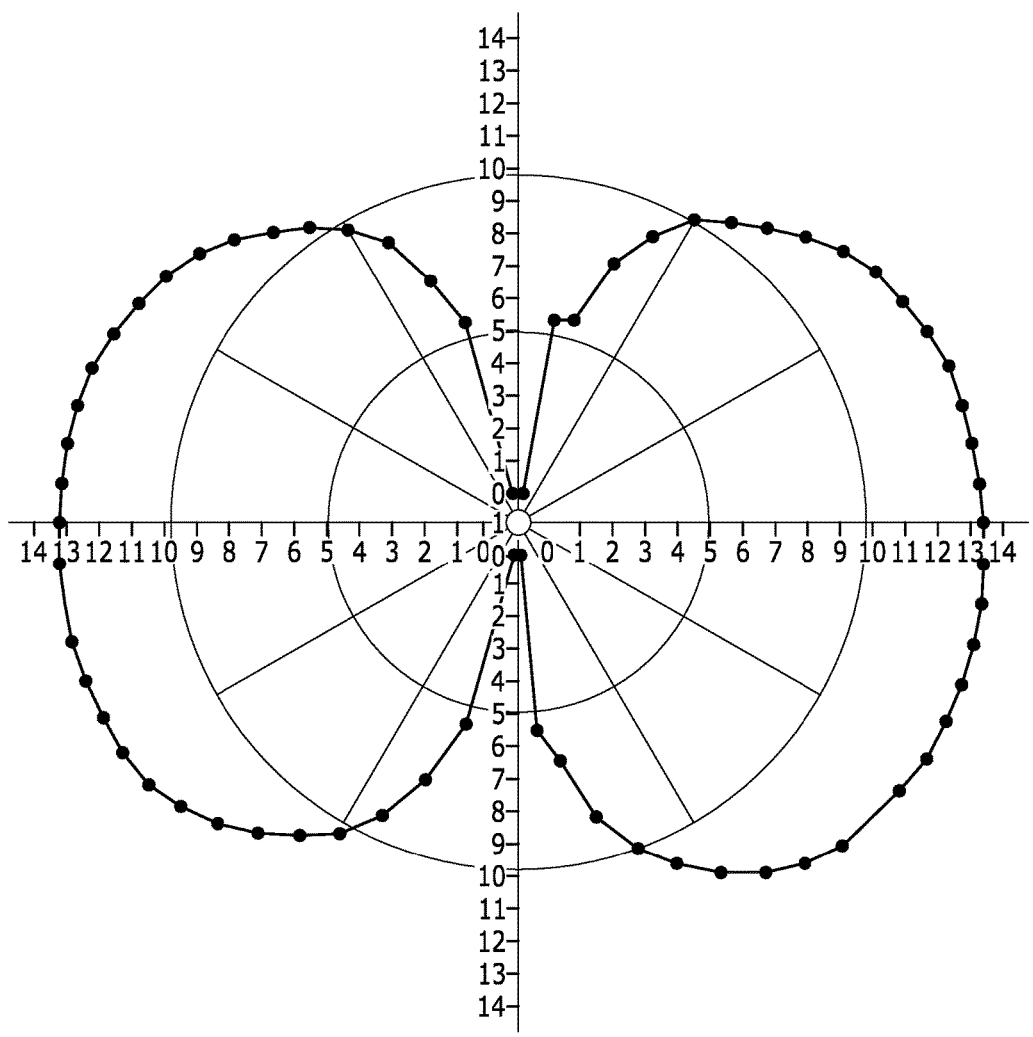
Figure 4B:
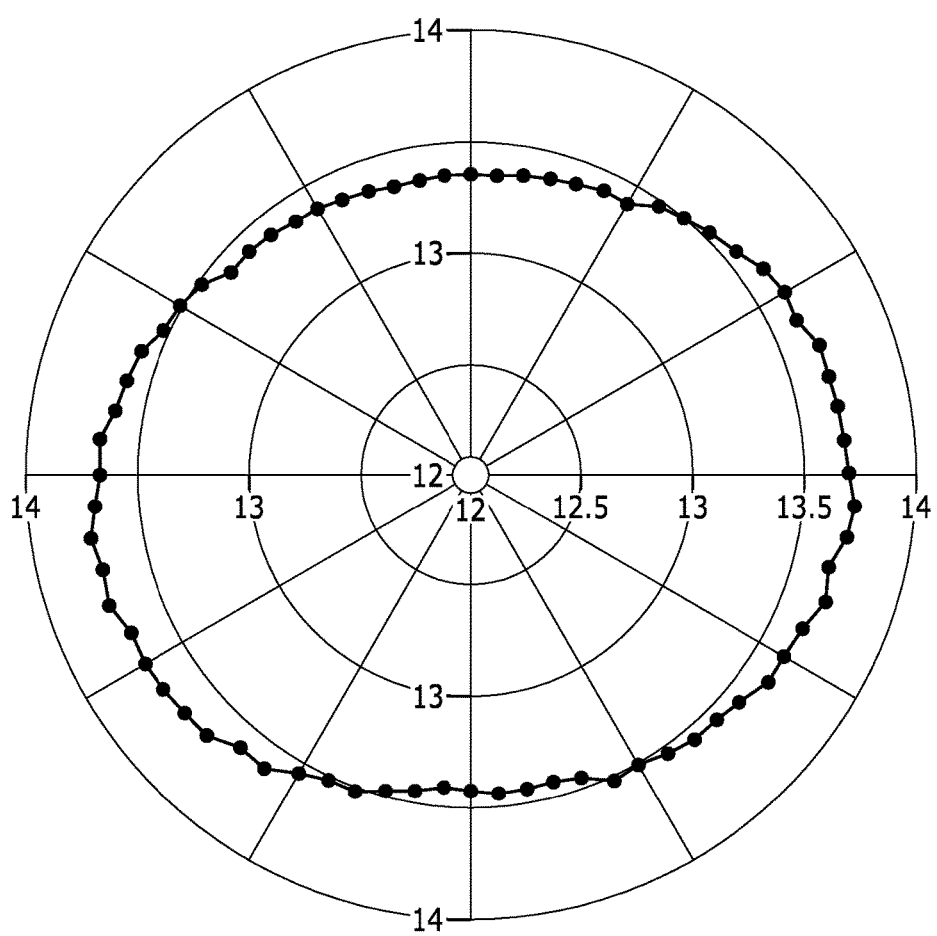
Figure 5:
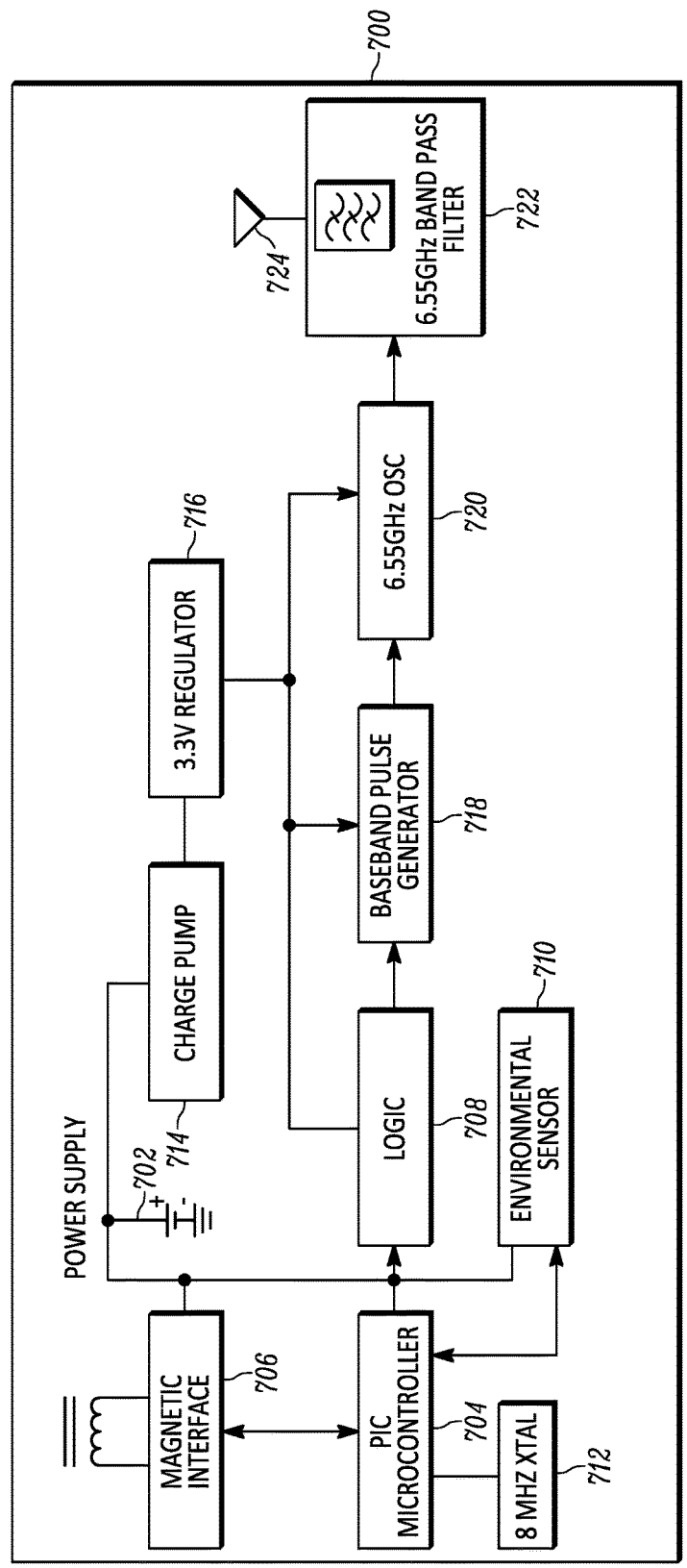
Figure 6:
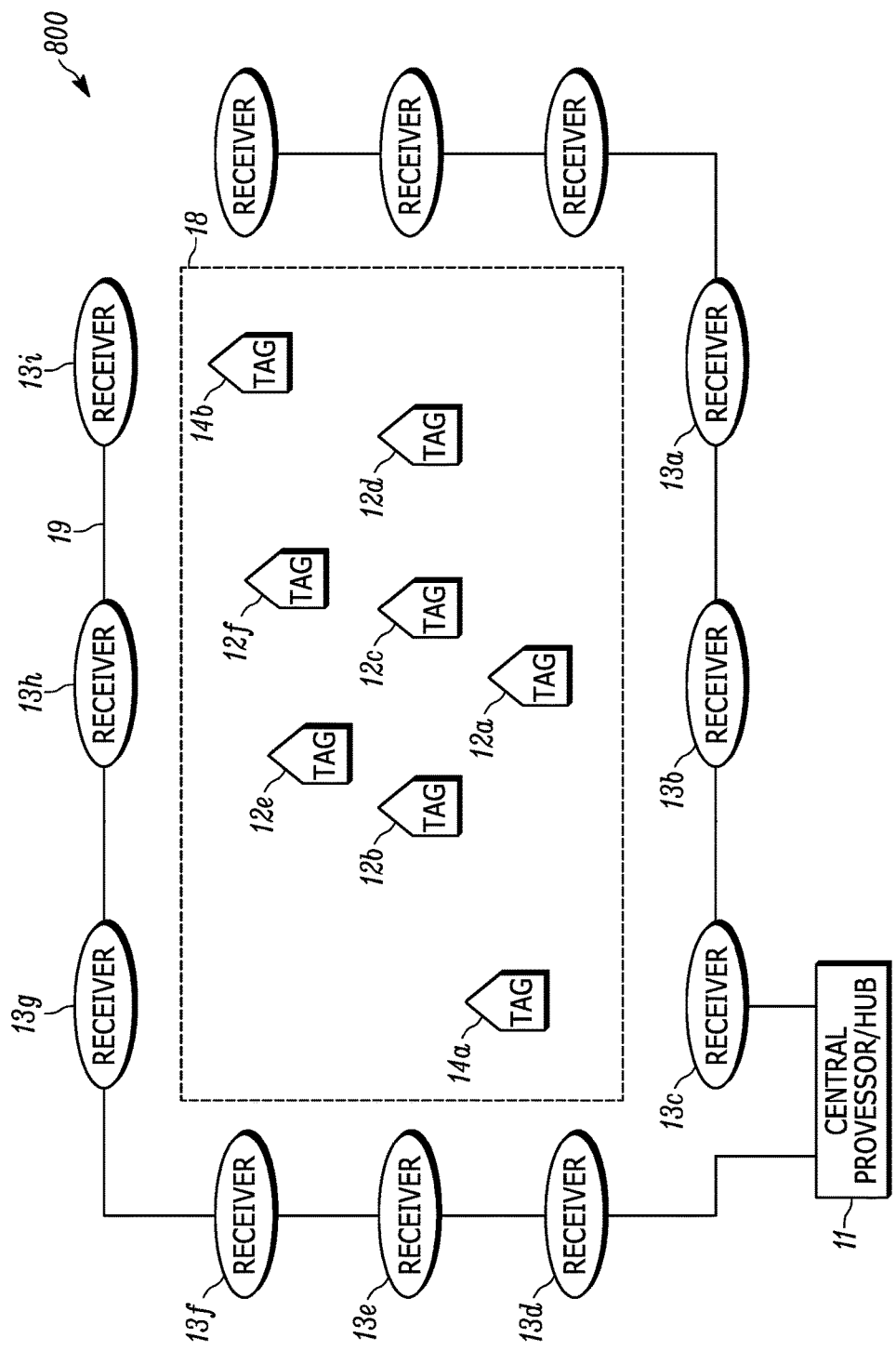
Figure 7:
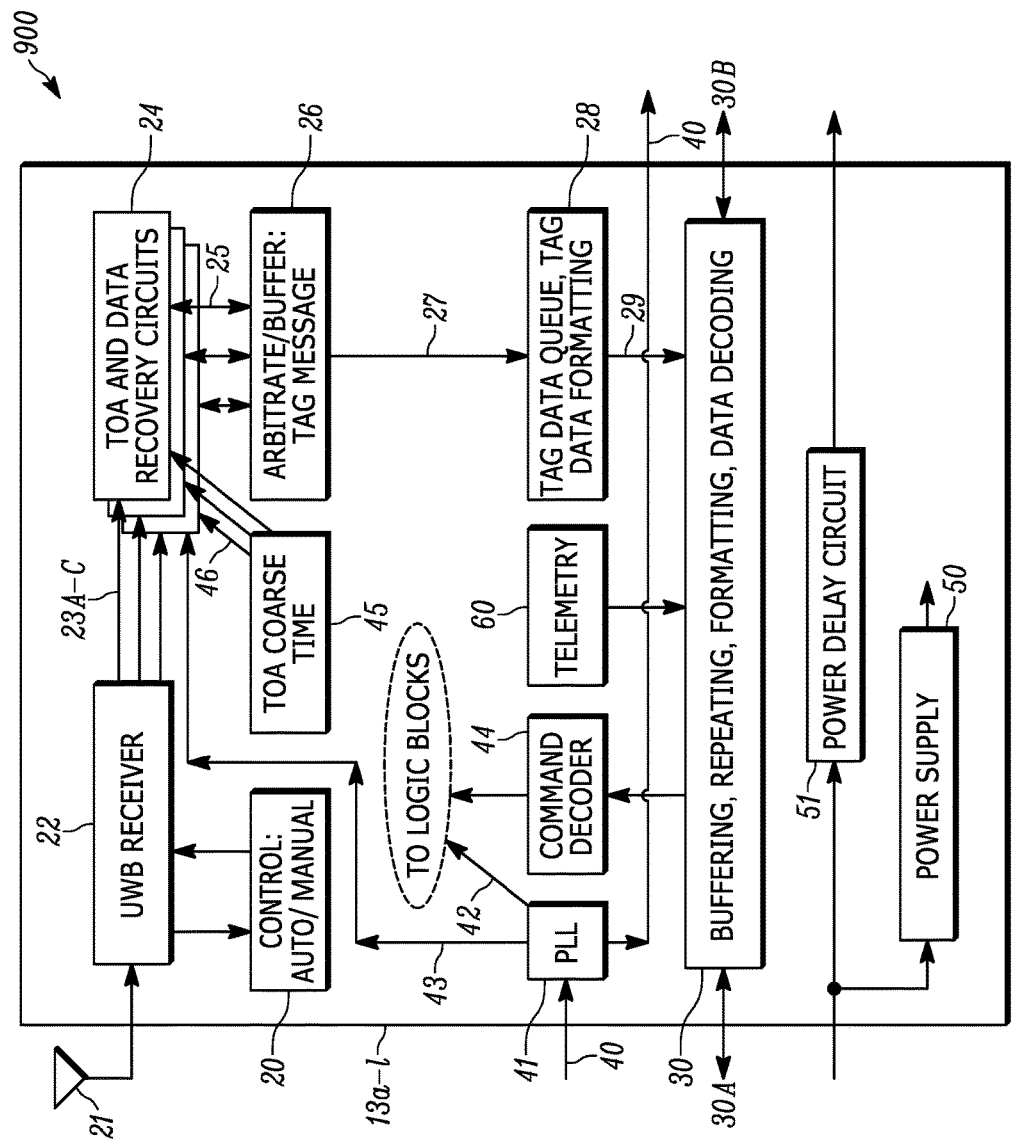
Figure 8:
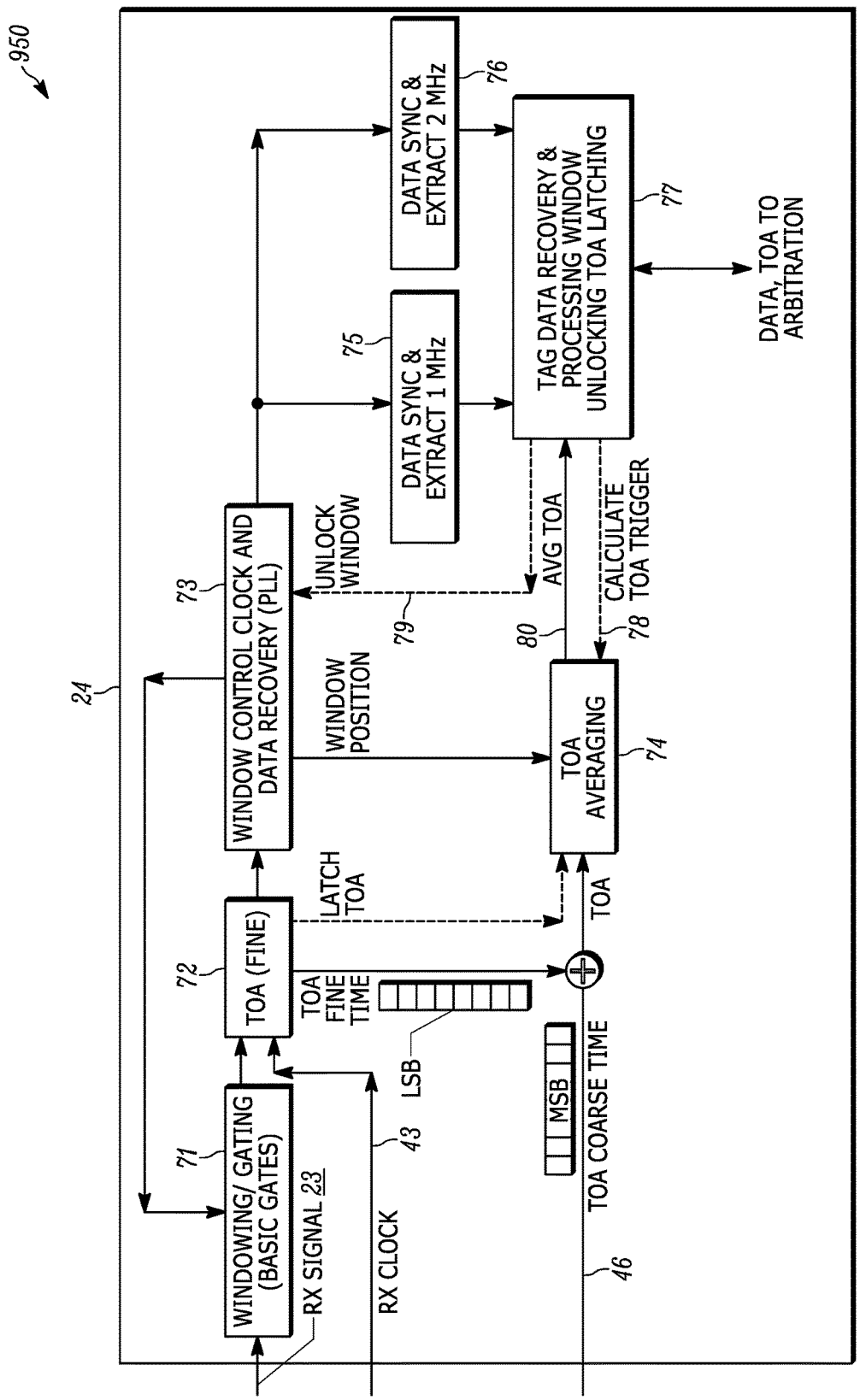
Figure 9:
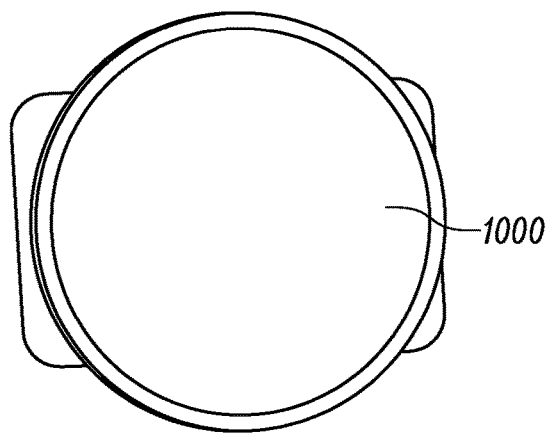
Figure 9:
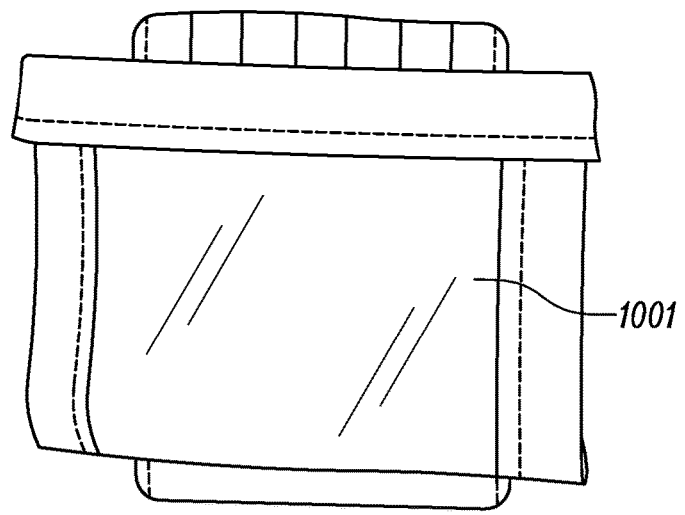

Having thus described the invention in general terms, reference will now be made to the accompanying drawings, which are not necessarily drawn to scale, and wherein:

FIG. 1A illustrates an exemplary oblong miniature and impact resistant RTLS tag in accordance with some embodiments of the present invention;

FIG. 1B illustrates components of an exemplary oblong miniature and impact resistant RTLS tag in accordance with some embodiments of the present invention;

FIG. 1C illustrates an internal view of an exemplary oblong miniature and impact resistant RTLS tag in accordance with some embodiments of the present invention;

FIG. 1D illustrates a first side of an exemplary RTLS tag assembly of an oblong miniature and impact resistant RTLS tag in accordance with example embodiments of the present invention;

FIG. 1E illustrates a second side of an exemplary RTLS tag assembly of an oblong miniature and impact resistant RTLS tag in accordance with example embodiments of the present invention;

FIG. 1F illustrates an assembly view of an exemplary antenna element and antenna support of an oblong miniature and impact resistant RTLS tag in accordance with example embodiments of the present invention;

FIG. 1G illustrates an assembly view of an exemplary shielded printed circuit board assembly and cup seal of an oblong miniature and impact resistant RTLS tag in accordance with example embodiments of the present invention;

FIG. 1H illustrates an exemplary shielded and sealed printed circuit board assembly of an oblong miniature and impact resistant RTLS tag in accordance with example embodiments of the present invention;

FIG. 1I illustrates a layout of an exemplary shielded and sealed printed circuit board assembly of an oblong miniature and impact resistant RTLS tag in accordance with example embodiments of the present invention;

FIG. 2A illustrates a theoretical elevation radiation pattern for a correctly dimensioned diameter with respect to the RF driving frequency of an RTLS tag circular patch antenna in accordance with example embodiments of the present invention;

FIG. 2B illustrates an experimental elevation radiation pattern for an antenna of an oblong miniature and impact resistant RTLS tag in accordance with example embodiments of the present invention;

FIG. 2C illustrates an experimental azimuth radiation pattern, at elevation 40 degrees, for an antenna of an oblong miniature and impact resistant RTLS tag with a correcting conducting element in accordance with example embodiments of the present invention;

FIG. 3A illustrates an exemplary circular miniature and impact resistant RTLS tag in accordance with example embodiments of the present invention;

FIG. 3B illustrates an assembly view of an exemplary RTLS tag assembly for a circular miniature and impact resistant RTLS tag in accordance with example embodiments of the present invention;

FIG. 3C illustrates an assembly view of an exemplary RTLS tag assembly for a circular miniature and impact resistant RTLS tag in accordance with example embodiments of the present invention;

FIG. 3D illustrates an assembly view of a circular miniature and impact resistant RTLS tag in accordance with example embodiments of the present invention;

FIG. 3E illustrates a first view of an exemplary RTLS tag assembly for a circular miniature and impact resistant RTLS tag in accordance with example embodiments of the present invention;

FIG. 3F illustrates a second view of an exemplary RTLS tag assembly for a circular miniature and impact resistant RTLS tag in accordance with example embodiments of the present invention;

FIG. 3G illustrates a third view of an exemplary RTLS tag assembly for a circular miniature and impact resistant RTLS tag in accordance with example embodiments of the present invention;

FIG. 3H illustrates an exemplary partially assembled circular miniature and impact resistant RTLS tag in accordance with example embodiments of the present invention;

FIG. 3I illustrates a first view of an exemplary printed circuit board assembly for a circular miniature and impact resistant RTLS tag in accordance with example embodiments of the present invention;

FIG. 3J illustrates a second view of an exemplary printed circuit board assembly for a circular miniature and impact resistant RTLS tag in accordance with example embodiments of the present invention;

FIG. 3K illustrates a schematic of a first layer of an exemplary printed circuit board for a circular miniature and impact resistant RTLS tag in accordance with example embodiments of the present invention;

FIG. 3L illustrates a schematic of a second layer of an exemplary printed circuit board for a circular miniature and impact resistant RTLS tag in accordance with example embodiments of the present invention;

FIG. 3M illustrates a schematic of a third layer of an exemplary printed circuit board for a circular miniature and impact resistant RTLS tag in accordance with example embodiments of the present invention;

FIG. 3N illustrates an exemplary cup seal for a circular miniature and impact resistant RTLS tag in accordance with example embodiments of the present invention;

FIG. 3O illustrates a placement of an exemplary cup seal on a printed circuit board for a circular miniature and impact resistant RTLS tag in accordance with example embodiments of the present invention;

FIG. 3P illustrates an exemplary circular miniature and impact resistant RTLS tag in accordance with example embodiments of the present invention;

FIG. 3Q illustrates an internal view of an exemplary circular miniature and impact resistant RTLS tag in accordance with example embodiments of the present invention;

FIG. 3R illustrates components of an exemplary circular miniature and impact resistant RTLS tag in accordance with example embodiments of the present invention;

FIG. 4A illustrates an experimental elevation radiation pattern for an antenna of a circular miniature and impact resistant RTLS tag in accordance with example embodiments of the present invention;

FIG. 4B illustrates an experimental azimuth radiation pattern for an antenna of a circular miniature and impact resistant RTLS tag with a correcting conducting element in accordance with example embodiments of the present invention;

FIG. 5 illustrates a block diagram schematic of an exemplary miniature and impact resistant RTLS tag in accordance with example embodiments of the present invention;

FIG. 6 illustrates an exemplary environment using a real time locating system for providing performance analytics in accordance with some embodiments of the present invention;

FIG. 7 illustrates an exemplary receiver in a real time locating system that may be configured in accordance with some embodiments of the present invention; and FIG. 8 illustrates an example time-of-arrival and recovery circuit function from the exemplary receiver of FIG. 7 in accordance with some embodiments of the present invention; and FIG. 9 illustrates an exemplary impact resistant RTLS tag with its associated band and casing unit in accordance with some embodiments of the present invention.

DETAILED DESCRIPTION OF THE INVENTION

Some embodiments of the present inventions will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the following descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Active radio frequency identification (RFID) systems or real-time location systems (RTLS) provide for ultra wide band (UWB) transmitters incorporated with each RTLS tag transmitter and a grid of receivers to resolve a collection of time of arrival (TOA) measurements to locate the RTLS tag transmitters. Presently, active RTLS target location systems provide for approximately one nanosecond (ns) TOA accuracy and resolution at an example, non-limiting, range of 500 feet. Active RTLS target location systems accuracy and resolution are limited by the allowable energy and the width of a timing pulse from an RTLS tag transmitter and a detection window width associated with the grid of receivers. Further limitations include multipath effects, particularly difficult in high-reverberation environments, and low signal-to-noise ratios (SNRs) that are more apparent in long-range detection.

Additionally, RTLS tags themselves may be configured to operate in non-ideal environments. One example of a harsh environment that may influence RTLS tag performance is a high-impact environment, such as an American football environment (e.g., where RTLS tags are affixed to players playing American football, etc.). RTLS tag printed circuit boards (PCBs) and incorporated antennas or antenna arrays must be designed to absorb tremendous impact, perhaps up to and above 100-200 g's, and respond immediately with performance that is not degraded.

To do so, and to function and perform whilst being exposed to such extreme conditions, the RTLS tag design and packaging is critical. In particular, the RTLS tag electrical-mechanical interface design and construction requires attention directed to the radio frequency (RF) shielding around the transmitter electronics to prevent spurious radiation that effects a change in the far-field antenna pattern.

One example objective of embodiments of this invention is to incorporate a miniature and impact resistant (MIR) RTLS tag with electrically isolated transmitter electronics. The electrical and mechanical design, construction, and packaging of the MIR RTLS tag are also, for example, important to the electrical and mechanical isolation of the aforementioned transmitter electronics. In some example embodiments, the combination of antenna design, use of packing material and size (e.g., to fit in a void created by protective equipment, such as shoulder pads), enable real time locating tracking in high-impact environments, such as in a football environment.

Example MIR RTLS Tags

MIR RTLS tags may be structured in various different embodiments. For example, FIGS. 1A through 1I illustrate an exemplary oblong MIR RTLS tag configuration according to one embodiment and FIGS. 3A through 3R illustrate an exemplary circular MIR RTLS tag configuration according to another embodiment. To provide performance in dynamic environments such as illustrated in FIG. 6 (described below), for example an American football environment, the MIR RTLS tags are designed and configured to improve the uniformity of the radiation patterns produced by the MIR RTLS tags.

FIG. 1A illustrates an exemplary oblong MIR RTLS tag 100 in accordance with some embodiments of the present invention. The oblong MIR RTLS tag 100 may be configured to function and perform whilst being exposed to extreme conditions, such as in a high-impact environment such as an American Football environment. In some embodiments, the oblong MIR RTLS tag 100 may comprise a hard and impact resistant housing which may withstand forces above and beyond 100-200 g's. In some examples, the oblong MIR RTLS tag 100 may be shaped to be received in a void defined by equipment, such as shoulder pads. In other examples, the oblong MIR RTLS tag 100 may be sized to be small and unobtrusive to a wearer, for example a participant in an American football game. The oblong MIR RTLS tag 100 may be configured such that electrical and/or mechanical isolation may be provided for various components comprised within the oblong MIR RTLS tag 100.

FIG. 1B illustrates some components of the exemplary oblong MIR RTLS tag 100 in accordance with some embodiments of the present invention. The oblong MIR RTLS tag 100 comprises a compact high bandwidth antenna element 104, an antenna support 106, an oblong printed circuit board (PCB) 108, a power supply 110, and an oblong MIR tag housing 102. The oblong MIR RTLS tag 100 further comprises a RF shield (e.g., a metal can) positioned over transmitter electronics and a cup seal 124 seated over the RF shield. Details of these components of the oblong MIR RTLS tag 100 are presented in the figures shown herein and described in the following paragraphs. FIG. 1C illustrates an internal view of an exemplary oblong m MIR RTLS tag 100 in accordance with some embodiments of the present invention. FIG. 1C illustrates an assembled oblong MIR RTLS tag 100. The components of the oblong MIR RTLS tag 100 are assembled in a unit comprising the compact high bandwidth antenna element 104, the antenna support 106, the oblong PCB 108 with transmitter electronics 120 shielded by the RF shield 122 and sealed by cup seal 124, and the power supply 110. These assembled tag components are then seated in the oblong MIR tag housing 102 and affixed using potting material 112.

FIG. 1D illustrates a first side of an exemplary RTLS tag assembly 103 of the oblong MIR RTLS tag 100 in accordance with example embodiments of the present invention. FIG. 1D illustrates the compact high bandwidth antenna element 104 seated in the antenna support 106. The compact high bandwidth antenna element 104 seated in the antenna support 106 is affixed to a first side of the oblong PCB 108 and operationally connected to the oblong PCB 108 transmitter electronics. The RTLS tag assembly 103 of the oblong MIR RTLS tag 100 is configured such that the surface of the oblong PCB 108 acts as a ground plane 136 for the antenna, such that the antenna element and the ground plane form the radiating structure of the oblong MIR RTLS tag 100.

FIG. 1E illustrates a second side of an exemplary RTLS tag assembly 103 of an oblong MIR RTLS tag 100 in accordance with example embodiments of the present invention. FIG. 1E illustrates the second side of the RTLS tag assembly 103 with the power supply 110 (e.g., battery) affixed and operationally connected to the second side of the oblong PCB 108. The view of the second side of the oblong PCB 108, shown in FIG. 1E, further illustrates tag electronics 130 affixed to the oblong PCB 108, including the magnetic inductance coil 132 and the microcontroller crystal 134. A grounding layer is provided to control the impedance of the RF generating electronics.

FIG. 1F illustrates an assembly view of an exemplary compact high bandwidth antenna element 104 and antenna support 106 of the oblong MIR RTLS tag 100 in accordance with example embodiments of the present invention. The assembly view of the high bandwidth antenna element 104 and the antenna support 106, shown in FIG. 1F, demonstrates an example positioning of the antenna support 106 with the compact high bandwidth antenna element 104. A coax RF feed is provided to the compact high bandwidth antenna element 104 through an antenna aperture 114 in the antenna enclosure 111. In some embodiments, the antenna aperture 114 provides for the RF coax feed to be a center feed to the compact high bandwidth antenna element 104. In some embodiments, the high bandwidth antenna element 104 comprises a circular or nearly-circular disk. In some embodiments, the high bandwidth antenna element 104 is composed of brass.

The antenna support 106 is configured to provide mechanical support to the high bandwidth antenna element 104, while participating in the tuning of the antenna. The antenna support 106 allows the antenna element 104 to be short and wide. The antenna support 106 is further configured to provide protection of the antenna element, where the oblong MIR RTLS tag 100 may absorb impacts of, in some examples, up to and beyond 100-200 g's. In some example embodiment, the antenna support 106 is a hard plastic, a resin, or the like. In some example embodiments, the antenna support 106 is composed of a polyester material.

The shape of the compact high bandwidth antenna element 104, e.g., the step features, contributes to the tuning of the antenna. The antenna element 104 is designed to have a low profile while maintaining adequate bandwidth. This is why the antenna element 104 has a mushroom shape and a tight-fitting plastic support in some embodiments. For example, a wide bandwidth is desired for the MIR RTLS tag in a UWB system. In general a fat monopole antenna would provide for a wide bandwidth, however, requirements of the environments in which the MIR RTLS tag might be used create a height limitation on the design of the MIR RTLS tag. As such, the compact high bandwidth antenna element 104 is designed with dimensions that allow for an acceptable compromise between the height and bandwidth of the antenna. In example embodiments, the compact high bandwidth antenna element 104 may provide a bandwidth of 400-500 MHz, approximately 8% fractional bandwidth.

The antenna radiating structure is comprised of a conducting plane and a ground plane, or image plane. Important, in some examples, to the functioning of the antenna radiating structure are the sizes and relative sizes of the conducting plane and the ground plane. The size and shape of the conducting plane and the ground plane, as well as the RF feed position, may comprise an important parameter set, with the addition of the RF driving frequency, to the generation of the radiation patterns associated with the antenna 110. For example, by limiting the overall diameter of the ground plane, a "donut shape" radiation pattern may be achieved. A larger diameter may tilt the pattern up, giving more of a "butterfly shape". The choice of material for the antenna support 106 is part of the compromise between the height and bandwidth of the antenna.

The compact high bandwidth antenna element 104 of the present invention is not strictly a patch antenna, but approximately a raised circular patch antenna with tuning sections underneath. As such, the antenna 110 of the present invention is a cross between a patch antenna and a short monopole, with a hybrid second fundamental mode (TM02) mode approximating a TM02 mode evident in an equivalently dimensioned circular patch antenna.

FIG. 1G illustrates an assembly view of an exemplary shielded printed circuit board assembly and cup seal of an oblong miniature and impact resistant RTLS tag 100 in accordance with example embodiments of the present invention. As illustrated in FIG. 1G an RF shield 122 (e.g., a metal can) is placed over the transmitter electronics, e.g., the RF filter and transmitter, to prevent parasitic radiation for the transmitter electronics which can have an adverse effect on the overall radiation pattern and affect the allowable transmit power level. In some examples, the RF shield 122 may serve to prevent an unwanted (anisotropic and unmanageable) coherent signal from being transmitted along with the radiation from the antenna. FIG. 1G further illustrates the cup seal 124 which is used to form a protective layer over the RF shield 122 and an antenna feed aperture in the PCB, in some example embodiments. The assembled view, shown in FIG. 1H, demonstrates example placement of a cup seal 124 over the RF shield 122 in the oblong MIR RTLS tag 100.

The cup seal 124 serves to provide a protective seal or barrier around the RF shield 122, such that a potting material may be applied to rigidly affix the RTLS tag assembly 103 within the oblong MIR tag housing 102 without the effect of the potting material seeping under the RF shield 122. Potting material seeping under the RF shield 122, or into the antenna aperture, may effect a change in the tuning of the antenna and transmitter, in some example embodiments.

FIG. 1H illustrates an exemplary shielded and sealed printed circuit board assembly of an oblong miniature and impact resistant RTLS tag in accordance with example embodiments of the present invention. In some embodiments, the cup seal 124 is molded to form-fit over the RF shield 122, and may be sealed to the PCB, as shown in FIG. 1H. In some embodiments, the cup seal 124 may be made from a cellulose, polyester, or polyethylene material. The flexibility of the cup seal 124 allows for a tight seal around the RF shield 122, and prevents the flow of the applied potting material under the RF shield 122 or into the antenna aperture.

The potting material is a dielectric material. As such, if the potting material were to seep under the RF shield 122, it would adversely affect the tuning of the antenna and transmitter and increase the losses. In principle, the potting material could be factored into those parts as well, but the potting material would be required to fill the RF section, which is difficult. Additionally, it would require the potting to be entirely consistent from tag to tag. If the potting material were to penetrate into the antenna aperture, the dielectric nature of the potting material would impact, in some examples, the transmit electronics tuning, change the spectrum, and reduce power, unless taken into account in the design.

FIG. 1I illustrates a PCB layout 108 of an exemplary shielded and sealed PCB assembly of an oblong MIR RTLS tag 100 in accordance with example embodiments of the present invention. The PCB layout 108 provides the interconnections for the signal processor PCB layer, giving a clearer picture of the electrical-mechanical interface of the RTLS tag assembly. FIG. 1I demonstrates the transmitter electronics 120, the RF shield 122 for the transmitter electronics 120, and the associated cup seal 124, sealed to the PCB. FIG. 1I also illustrates an example antenna aperture 114 in the PCB that allows for the RF feed 116 to the antenna (not shown).

It is precisely the antenna aperture 114 and RF feed 116 that drive the requirement for the cup seal 124 to enclose the RF shield 122. Without the cup seal 124, the potting material applied to mechanically secure the RTLS tag assembly within the oblong MIR tag housing 102 would result in unpredictable antenna radiation spectrum, power level, and pattern. The inability to predict the flow of the potting material about the antenna aperture 114 and RF feed 116 would provide for an electronic environment wherein the dielectric nature of the applied potting material influences the antenna performance, particularly impedance. As such, the antenna radiation spectra, for example, would not be repeatable from assembly-to-assembly, from tag-to-tag.

In one example embodiment, where the antenna is a circular antenna, the application of the cup seal 124 in conjunction with the mechanically stabilizing potting material is, in some examples, advantageous to the design and packaging of the example embodiment for the oblong MIR RTLS tag. The circular antenna is extremely sensitive to perturbations involving a dielectric material. The cup seal 124 may serve to prevent the potting material (e.g., epoxy) from seeping under the RF shield 122 and making contact with the transmitter electronics. The cup seal 124 may also prevent the potting material from contacting the antenna aperture 114.

By controlling the flow of the potting material (e.g., epoxy), and by preventing contact of the potting material with the transmitter electronics and the antenna aperture, the dielectric elements in the path from the transmitter electronics and RF center feed and antenna aperture are controlled, providing for a predictable, consistent antenna input impedance.

FIG. 2A illustrates a theoretical elevation radiation pattern for a correctly dimensioned diameter with respect to the RF driving frequency of an RTLS tag circular patch antenna in accordance with example embodiments of the present invention;

FIG. 2A illustrates a theoretical elevation radiation pattern 300A for a correctly dimensioned antenna of an RTLS tag, operating with a center frequency of 6550 MHz with a −3 dB bandwidth of approximately 400 MHz, in accordance with example embodiments of the present invention.

In some examples, the relationship between the radius (a) of the circular antenna and its resonant frequency ($f_{res}$) may be approximated by a second fundamental mode (TM02) for a similarly dimensioned patch antenna, with a uniform radiation pattern in azimuth, the relationship given by:

$$f_{res} = c/2\pi\sqrt{\epsilon_r} \cdot X'_{02}/a \qquad (1)$$

$$\delta/\delta x = 0 \qquad (2)$$

Where:
a=patch antenna radius
$\epsilon_r$=relative dielectric constant
c=speed of light (in vacuum)
$X'_{02}=2^{nd}$ zero of $1^{st}$ derivative of $0^{th}$-order Bessel function of the first kind
$J_0=0^{th}$-order Bessel function of the $1^{st}$ kind The radiation pattern 300A, uniform in azimuth, in some examples, is generated by coupling RF energy from the coaxial feed into RF center feed of the circular antenna. The radiation pattern 300A may be nearly uniform in azimuth, but asymmetric in elevation. In such an example, the RF power may be radiated in the horizontal plane, parallel to the conducting plane and the ground plane of the antenna.

Specifically, in some examples the ground plane 136B is dimensioned with a smaller radius than the conducting plane 110B.

The design of the ground plane 136B with a smaller diameter than the conducting plane 110A may be driven by packaging constraints, by a requirement to reduce the size of the MIR RTLS tag to satisfy systems requirements. In the present example embodiment, the requirement for a radiation pattern that is symmetric in elevation competes with packaging constraints for the MIR RTLS tag.

FIG. 2B illustrates an experimental elevation radiation pattern for an antenna of an oblong miniature and impact resistant RTLS tag in accordance with example embodiments of the present invention.

The radiation pattern 300B, shown in FIG. 2B, is a result of the oblong ground plane 136 for the antenna, before the application of the potting compound. The radiation pattern 300B may be somewhat 'butterfly' patterned, a result of the oblong ground plane 136. The radiation pattern 300B is now asymmetric in azimuth, as would be expected by an antenna that itself in not symmetric in azimuth.

Both the 'butterfly' radiation pattern and the asymmetry in azimuth limit compact high bandwidth antenna element 104 performance. In some examples, a regulatory body, such as the Federal Communication Commission (FCC) may regulate EIRP in the frequency band used by the antenna, in accordance with examples of the present invention. Any asymmetry, in some examples, either due to the aforementioned 'butterfly' pattern that is a result of multimodal radiation, or due to the asymmetry of the antenna itself, results in, for a maximum EIRP, a drop-off in total power since for some directions, EIRP will then be below the maximum allowed.

In some examples, a reduction in the radiation pattern asymmetry may be achieved by altering either the dimensions of the conductive plane or the dimensions of the ground plane. Example results for changing the radiation pattern as a function of the conducting plane and ground plane dimensions have been demonstrated in radiation patterns 300A-B.

In some examples, the radiation pattern 300B shows a reversal in the relative radiation power between 0 and 180 degree elevation angles, between the top and bottom of the antenna 110, with respect to the previous radiation pattern 300A. As an example, the radiation pattern 300B shows a greater RF power radiated from the top of the antenna than from the bottom.

Given the effectiveness in reshaping the radiation pattern in elevation, by reshaping the ground plane, as seen in some example embodiments, the radiation pattern is also alterable in azimuth by reshaping the ground plane.

One of the many advantages of the antenna associated with examples of the present invention is the flexibility in producing radiation patterns with small perturbances in the conducting plane and the ground plane, and by introducing small conductive elements and dielectric elements to critical areas of the PCBs to effect predictable changes in radiation patterns.

FIG. 2C illustrates an experimental azimuth radiation pattern, at elevation 40 degrees, for an antenna of an oblong miniature and impact resistant RTLS tag with a correcting conducting element in accordance with example embodiments of the present invention;

FIG. 2C illustrates an experimental azimuth radiation pattern 300C, at elevation 40 degrees, for an antenna, with a correcting conducting element, in accordance with example embodiments of the present invention. As can be seen in FIG. 2C, radiation pattern 300C is nearly uniform in azimuth, nearly omni-directional. Alternatively or additionally, the radiation pattern may be uniform in azimuth and may be omni-directional. The radiation pattern 300C was generated, in some examples, from a circular-shaped monopole antenna, with an oval-shaped ground plane or tag beneath it.

FIG. 3A illustrates an exemplary circular miniature and impact resistant RTLS tag in accordance with example embodiments of the present invention. The circular MIR RTLS tag 500 may be configured to function and perform whilst being exposed to extreme conditions, such as in a high-impact environment such as an American Football environment. In some embodiments, the circular MIR RTLS tag 500 may comprise a hard and impact resistant housing which may withstand forces above and beyond 100-200 g's. In some examples, the circular MIR RTLS tag 500 may be shaped to be received in a void defined by equipment, such as shoulder pads. In other examples, the circular MIR RTLS tag 500 may be sized to be very small and unobtrusive to a wearer, for example a participant in an American football game. The circular MIR RTLS tag 500 may be configured such that electrical and/or mechanical isolation may be provided for various components comprised within the circular MIR RTLS tag 500. In an example embodiment, in addition to being circular rather than oblong, the circular MIR RTLS tag 500 may be further miniaturized from the oblong MIR RTLS tag, having dimensions of approximately 2.0-2.3 cm diameter by 0.7-0.9 cm high. By making the circular MIR RTLS tag 500 more symmetric, a more symmetric radiation pattern may be achieved.

FIG. 3B illustrates an assembly view of an exemplary RTLS tag assembly for a circular MIR RTLS tag 500 in accordance with example embodiments of the present invention. As shown in FIG. 3B, the RTLS tag assembly for circular MIR RTLS tag 500 comprises a compact high bandwidth antenna element 504, an antenna support 506, and a circular PCB 508. The circular MIR RTLS tag 500 further comprises a cup seal 524 which may be positioned over the transmitter electronics on the circular PCB 508. In some embodiments, the circular PCB 508 may include an orientation bump to align with the circular tag housing 502, and an environmental sensor if provided. In some embodiments, a gasket 516 may be molded into the antenna support 506 to exclude potting material from the antenna area. Further details of these components of the circular MIR RTLS tag 500 are presented in the figures shown herein and described in the following paragraphs.

FIG. 3C illustrates a further assembly view of an exemplary RTLS tag assembly for the circular MIR RTLS tag 500 in accordance with example embodiments of the present invention. In FIG. 3C, the power supply 510 (e.g., battery) is illustrated showing the alignment with the circular PCB 508. When secured in place, the power supply securely retains the cup seal 524 in place over the transmitter electronics on the circular PCB 508.

FIG. 3D illustrates a further view of a circular miniature and impact resistant RTLS tag in accordance with example embodiments of the present invention. FIG. 3D illustrates the placement of the circular RTLS tag assembly 503 into the circular tag housing 502, where the orientation bump 518 may be used in some embodiments to properly align the circular RTLS tag assembly 503 within the circular tag housing 502. The circular RTLS tag assembly 503 is then securely affixed within the circular tag housing 502 by the application of potting material (not shown), FIG. 3E illustrates a first view of an exemplary RTLS tag assembly of a circular MIR RTLS tag 500 in accordance with example embodiments of the present invention. This view of the circular MIR RTLS tag assembly 503 illustrates the power supply 510 affixed to a first side of the circular PCB 508. FIG. 3F illustrates a second view of the circular MIR RTLS tag assembly 503 of a circular MIR RTLS tag 500 in accordance with example embodiments of the present invention. FIG. 3F illustrates the compact high bandwidth antenna element 504 and antenna support 506 (not shown) affixed to a second side of the circular PCB 508.

FIG. 3G illustrates a third view of the circular MIR RTLS tag assembly 503 of a circular MIR RTLS tag 500 in accordance with example embodiments of the present invention. FIG. 3G illustrates a profile view of the circular MIR RTLS tag assembly 503 showing the placement of the compact high bandwidth antenna element 504 within the antenna support 506, affixed to one side of the circular PCB 508. FIG. 3G further illustrates the cup seal 524 in place over the transmitter electronics and held in position by the power supply 510 affixed to the circular PCB 508.

FIG. 3H illustrates an exemplary partially assembled circular MIR RTLS tag 500 in accordance with example embodiments of the present invention. FIG. 3H illustrates the placement of the circular MIR RTLS tag assembly 503 within the circular tag housing 502 where the assembly is aligned with the housing using the orientation bump 518.

FIG. 3I illustrates a first view of an exemplary PCB and FIG. 3J illustrates a second view of an exemplary PCB for the circular MIR RTLS tag 500 in accordance with example embodiments of the present invention. FIG. 3I illustrates the first side 508a of the circular PCB 508 showing the orientation bump 518, transmitter electronics 520, and PCB antenna aperture 536. FIG. 3J illustrates the second side 508b of the circular PCB 508.

FIG. 3K through 3M illustrate schematics of a first layer, a second layer, and a third layer, respectively, of an exemplary PCB 508 of the circular MIR RTLS tag 500 in accordance with example embodiments of the present invention. In FIG. 3K, the first layer 530 is illustrated showing the antenna aperture 536 and PCB planes 538. FIG. 3L illustrates the second layer 532, or ground plane. FIG. 3K illustrates the third layer 534 showing the band pass filter 540.

In some embodiments, the circular MIR RTLS tag 102 may include a band pass filter 540 which is moved to the inner PCB layer 534, which may reduce the board area. Placement of the band pass filter 540 on the inner PCB layer, along with the PCB planes 538 around the transmitter electronics area on the other layers of the PCB board, eliminates the need for the RF shield discussed in relation to the oblong MIR RTLS tag. The reduced board area allows for a circular, e.g. round, PCB which provides a more symmetric radiation pattern, which in turn allows for a higher total radiation power in light of regulatory constraints. Battery 131 size may also be reduced due to the shape and size of the PCB footprint, for example a CR1616 battery may be used.

FIG. 3N illustrates an exemplary cup seal 524 for a circular MIR RTLS tag 500 in accordance with example embodiments of the present invention. The cup seal 524 is positioned over the transmitter electronics 520 on the circular PCB 508 to exclude potting material from the transmitter electronics. In some embodiments of the circular MIR RTLS tag 500, the cup seal 524 may be a low density polyethylene (LDPE) cup seal. In some embodiments, when the power source 510 is affixed to the PCB 508, the pressure exerted by the battery provides an adequate seal of the cup seal 524 against the PCB 502 to exclude the potting material from the transmitter electronics without application of an adhesive to the cup seal. The cup seal 524 is configured with battery supports 526 that assist in retaining the battery in a planar position when the circular MIR RTLS tag 500 is fully assembled. FIG. 3O illustrates the placement of the cup seal 524 on the circular PCB 508.

FIG. 3P illustrates an assembled circular MIR RTLS tag 500 in accordance with example embodiments of the present invention. FIG. 3P shows the RTLS tag assembly affixed within the circular tag housing 502 by the application of the potting material 512. The transparent circular tag housing 502 shown in FIG. 3P illustrates the use of the gasket 516 molded into the perimeter of antenna support 506 to exclude the potting material 512 from the antenna area (e.g., antenna element 504, antenna support 506) of the circular tag housing 502. The gasket 516 may also eliminate the need for an extra application of potting material above the antenna, while providing consistent potting profiles between circular MIR RTLS tags 500.

FIG. 3Q illustrates an internal view of an assembled circular MIR RTLS tag 500 in accordance with example embodiments of the present invention. The components of the circular MIR RTLS tag 500 are assembled in a unit comprising the compact high bandwidth antenna element 504, the antenna support 506 with the incorporated gasket 516, the circular PCB 508 with transmitter electronics sealed by cup seal 524, and the power supply 510. These assembled tag components are then seated in the circular tag housing 502 and affixed using potting material 512.

FIG. 3R illustrates the alignment of components of the exemplary circular MIR RTLS tag 500 in accordance with example embodiments of the present invention. FIG. 3R illustrates the positioning of the power supply 510, the cup seal 524 the circular PCB 508, the antenna support 506 with incorporated gasket 516, the compact high bandwidth antenna element 504, and the circular tag housing 502.

FIG. 4A illustrates an experimental elevation radiation pattern for an antenna of a circular miniature and impact resistant RTLS tag in accordance with example embodiments of the present invention. In environments where the MIR RTLS tag may be in use, it is a desire to have the most uniform radiation pattern possible (e.g., most like a sphere) to allow for effective reception of the data transmitted by the MIR RTLS tags at receivers positioned in the environment. As shown in FIG. 4A, the configuration of the circular MIR RTLS tag, including the placement of the band pass filter on an inner PCB layer and the elimination of the separate RF shield to allow for a smaller circular PCB board, provides for a more uniform antenna radiation pattern, as compared to the radiation pattern of the oblong MIR RTLS tag shown in FIG. 2B.

FIG. 4B illustrates an experimental azimuth radiation pattern for an antenna of a circular miniature and impact resistant RTLS tag with a correcting conducting element in accordance with example embodiments of the present invention.

FIG. 5 illustrates a block diagram schematic of an exemplary MIR RTLS tag in accordance with an example embodiment of the present invention. The MIR RTLS tag may include a power supply 702 (e.g., CR1616, CR2016), a microcontroller 704, magnetic interface 706, logic 708, environmental sensor 710, an oscillator 712, a charge pump 714, a voltage regulator 716, a baseband pulse generator 718, an oscillator 720, a band pass filter 722, and an antenna 724.

The power supply 702 may be attached to a ground and supply direct current to the microcontroller 704, magnetic interface 706, logic 708, environmental sensor 710, and charge pump 714. The power supply 702 may be a compact, 3-volt coin cell, such as series no. BR2335 (Rayovac) with a battery charge rating of 300 mAhr, or series no. CR2032, with a battery charge rating of 220 mAhr, series CR1616, or the like. The example 3-volt coin cell battery is provided as an example; one of ordinary skill in the art would recognize that other batteries may be used depending on the size, shape, or accessibility of the RTLS tag or controller 700.

The charge pump 718 may increase the supplied battery voltage, e.g., 3 volts for regulation by the voltage regulator 716, for example the voltage may be regulated at 3.3 volts and output to the logic 708, baseband pulse generator 718, and oscillator 720. The charge pump 714 may be a DC to DC (direct current) converter based on two stage capacitor switching. In some embodiments the output of the charge pump 714 may be smoothed by an output capacitor. The voltage regulator 716 may be a resistor in series with one or more diodes to provide a stable voltage, e.g., 3.3 volts.

The microcontroller 704, such as a programmable interface controller (PIC) microcontroller, may be configured to generate data packets, as described in regard to FIG. 6. The microcontroller 704 may include an internal memory, such as read only memory (ROM), electronic programmable memory (EPROM), flash ROM, or the like, configured to store program code for generation of the data packets and triggering data transmissions from the antenna 724, e.g., blink data. The microcontroller 704 may include a set of registers which may function as random access memory (RAM). The microcontroller 704 may store tag information, such as a tag UID, other identification information, a sequential burst count, stored tag data, or other desired information for object or personnel identification, inventory control, etc. in one or more registers. The microcontroller 704 may generate a data packet by reading one or more registers identified by the program code and transmits the data maintained in the registers to the logic 708.

Additionally, the microcontroller 704 may receive environmental data from the environmental sensor 710. In an example embodiment, the microcontroller 704 may store the sensor data in the registers. The environmental sensor 710 may be an accelerometer, a heart rate monitor, a humidity sensor, a temperature monitor, a moisture sensor, a breathing sensor, a GPS sensor, a proximity sensor, a pedometer, or the like. In an instance in which the microcontroller 704 receives environmental data from the environmental sensor 710, the microcontroller may include the environmental data or a portion of the environmental data in the data packet.

The microcontroller 704 may receive clock input from the oscillator 712, such as an 8 MHz crystal oscillator. The clock may be used by the microcontroller 704 to advance the program code.

In an example embodiment, the microcontroller may control the blink data pulse rate based on input from the environmental sensor 710. The microcontroller 704 may use a first blink data pulse rate, e.g., low, at a first time with a first environmental data value, and a second blink data pulse rate, e.g., high, at a second time with a second environmental data value. In some instances, the microcontroller 704 may make the determination of blink data pulse rate based on comparing the environmental data to a predetermined threshold. For example, the microcontroller may use a low or "idle" blink date pulse rate such as 1 blink per minute in an instance in which an environmental sensor, such as an accelerometer, does not detect movement, e.g. environmental data value fails to satisfy a predetermined threshold, and a high blink data pulse rate, such as 187 blinks or 73 blinks a msec, in an instance in which the accelerometer detects movement, e.g., environmental data value satisfies the predetermined threshold.

The magnetic interface 706 may provide control signals to the microcontroller 704. In an example embodiment, the control signals may write program code to an EPROM or flash ROM. The magnetic interface 706 may receive signals from a portable or fixed computing device via a low frequency transmitter. The signals may include commands, such as commence blink data pulse transmissions, terminate blink data pulse transmissions, blink data pulse transmission rate, or the like.

The microcontroller 704 may send the data packet to the logic 708. The logic 708 may be a transmission trigger configured to output the data packet when triggered by the microcontroller 704.

The data packet may be received by the base band generator 718. The baseband generator 718 may drive the oscillator 720 to generate a transmission signal, e.g. blink data pulse transmissions, which may carry the data packet. The transmission signal may be filtered by a band pass filter 722 prior to transmission by an antenna 724, e.g. blink data pulse transmissions.

Example Real Time Locating System

FIG. 6 illustrates an exemplary environment using a real time locating system for providing performance analytics in accordance with some embodiments of the present invention;

FIG. 6 illustrates an exemplary locating system 800 useful for calculating a location by an accumulation of location data or time of arrivals (TOAs) at a central processor/hub 11, whereby the TOAs represent a relative time of flight (TOF) from RTLS tags 12*a-f* as recorded at each receiver 13*a*-1 (e.g., UWB reader, etc.). A timing reference clock is used, in some examples, such that at least a subset of the receivers 13*a*-1 may be synchronized in frequency, whereby the relative TOA data associated with each of the RTLS tags 12*a-f* may be registered by a counter associated with at least a subset of the receivers 13*a*-1. In some examples, a reference tag 14*a-b*, preferably a UWB transmitter, positioned at known coordinates, is used to determine a phase offset between the counters associated with at least a subset of the of the receivers 13*a*-1. The RTLS tags 12*a-f* and the reference tags 14*a-b* reside in an active RTLS field 18. The systems described herein may be referred to as either "multilateration" or "geolocation" systems, terms that refer to the process of locating a signal source by solving an error minimization function of a location estimate determined by the difference in time of arrival between TOA signals received at multiple receivers 13*a*-1.

In some examples, the system comprising at least the RTLS tags 12*a-f* and the receivers 13*a*-1 is configured to provide two dimensional and/or three dimensional precision localization (e.g., subfoot resolutions), even in the presence of multipath interference, due in part to the use of short nanosecond duration pulses whose TOF can be accurately determined using detection circuitry, such as in the receivers 13*a*-1, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g., FCC and ETSI regulations), the RTLS tags 12*a-f* may operate with an instantaneous −3 dB bandwidth of approximately 400 MHz and an average transmission below 187 pulses in a 1 msec interval, provided that the rate is sufficiently low. In such examples, the predicted maximum range of the system, operating with a center frequency of 6.55 GHz, is roughly 200 meters in instances in which a 12 dbi directional antenna is used at the receiver, but the projected range will depend, in other examples, upon receiver antenna gain. Alternatively or additionally, the range of the system allows for one or more RTLS tags 12*a-f* to be detected with one or more receivers positioned throughout a football stadium used in a professional football context. Such a configuration advantageously satisfies constraints applied by regulatory bodies related to peak and average power densities (e.g., effective isotropic radiated power density ("EIRP")), while still optimizing system performance related to range and interference. In further examples, tag transmissions with a −3 dB bandwidth of approximately 400 MHz yields, in some examples, an instantaneous pulse width of roughly 2 nanoseconds that enables a location resolution to better than 30 centimeters.

Referring again to FIG. 6, the object to be located has an attached RTLS tag 12*a-f*, preferably a tag having a UWB transmitter, that transmits blink data (e.g., multiple pulses at a 1 Mb/s burst rate, such as 112 bits of On-Off keying (OOK) at a rate of 1 Mb/s), and optionally, blink data comprising an information packet utilizing OOK that may include, but is not limited to, ID information, a sequential burst count, or other desired information for object or personnel identification, inventory control, etc. In some examples, the sequential burst count (e.g., a packet sequence number) from each RTLS tag 12*a-f* may be advantageously provided in order to permit, at a central processor/hub 11, correlation of TOA measurement data from various receivers 13*a*-1.

In some examples, the RTLS tag 12*a-f* may employ UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g., 112 bits of OOK at a rate of 1 Mb/sec, in some example embodiments), that advantageously enables a higher packet rate. If each information packet is unique, a higher packet rate results in a higher data rate; if each information packet is transmitted repeatedly, the higher packet rate results in a higher packet repetition rate. In some examples, higher packet repetition rate (e.g., 12 Hz) and/or higher data rates (e.g., 1 Mb/sec, 2 Mb/sec or the like) for each tag may result in larger datasets for filtering to achieve a more accurate location estimate. Alternatively or additionally, in some examples, the shorter length of the information packets, in conjunction with other packet rate, data rates, and other system requirements, may also result in a longer battery life (e.g., 7 years battery life at a transmission rate of 1 Hz with a 300 mAh cell, in some present embodiments).

Tag signals may be received at a receiver directly from RTLS tags, or may be received after being reflected en route. Reflected signals travel a longer path from the RTLS tag to the receiver than would a direct signal, and are thus received later than the corresponding direct signal. This delay is known as an echo delay or multipath delay. If reflected signals are sufficiently strong enough to be detected by the receiver, they can corrupt a data transmission through inter-symbol interference. In some examples, the RTLS tag 12*a-f* may employ UWB waveforms to achieve extremely fine resolution because of their extremely short pulse (e.g., 2 nsec) durations. Furthermore, signals may comprise short information packets (e.g., 112 bits of OOK) at a somewhat high burst data rate (1 Mb/sec, in some example embodiments), that advantageously enable packet durations to be brief (e.g., 112 microsec) while allowing inter-pulse times (e.g., 998 nsec) sufficiently longer than expected echo delays, avoiding data corruption Reflected signals can be expected to become weaker as delay increases due to the longer distances traveled. Thus, beyond some value of inter-pulse time (e.g., 998 nsec), corresponding to some path length difference (e.g., 299.4 m.), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. It will be understood that different environments can have different expected echo delays, so that different burst data rates and, hence, packet durations, may be appropriate in different situations depending on the environment.

Minimization of the packet duration also allows a tag to transmit more packets in a given time period, although in practice, regulatory average EIRP limits may often provide an overriding constraint. However, brief packet duration also reduces the likelihood of packets from multiple tags overlapping in time, causing a data collision. Thus, minimal packet duration allows multiple tags to transmit a higher aggregate number of packets per second, allowing for the largest number of tags to be tracked, or a given number of tags to be tracked at the highest rate.

In one non-limiting example, a data packet length of 112 bits (e.g., OOK encoded), transmitted at a data rate of 1 Mb/sec (1 MHz), may be implemented with a transmit tag repetition rate of 1 transmission per second (1 TX/sec). Such an implementation may accommodate a battery life of up to seven years, wherein the battery itself may be, for example, a compact, 3-volt coin cell of the series no. BR2335 (Rayovac), with a battery charge rating of 300 mAhr. An alternate implementation may be a generic compact, 3-volt coin cell, series no. CR2032, with a battery charge rating of 220 mAhr, whereby the latter generic coin cell, as can be appreciated, may provide for a shorter battery life.

Alternatively or additionally, some applications may require higher transmit tag repetition rates to track a dynamic environment. In some examples, the transmit tag repetition rate may be 12 transmissions per second (12 TX/sec). In such applications, it can be further appreciated that the battery life may be shorter.

The high burst data transmission rate (e.g., 1 MHz), coupled with the short data packet length (e.g., 112 bits) and the relatively low repetition rates (e.g., 1 TX/sec), provide for two distinct advantages in some examples: (1) a greater number of tags may transmit independently from the field of tags with a lower collision probability, and (2) each independent tag transmit power may be increased, with proper consideration given to a battery life constraint, such that a total energy for a single data packet is less than a regulated average power for a given time interval (e.g., a 1 msec time interval for an FCC regulated transmission).

Alternatively or additionally, additional sensor or telemetry data may be transmitted from the RTLS tag 12*a-f* to provide the receivers 13*a*-1 with information about the environment and/or operating conditions of the tag. For example, the RTLS tag may transmit a temperature to the receivers 13*a*-1. Such information may be valuable, for example, in a system involving perishable goods or other refrigerant requirements. In this example embodiment, the temperature may be transmitted by the tag at a lower repetition rate than that of the rest of the data packet. For example, the temperature may be transmitted from the tag to the receivers at a rate of one time per minute (e.g., 1 TX/min.), or in some examples, once every 720 times the data packet is transmitted, whereby the data packet in this example is transmitted at an example rate of 12 TX/sec.

Alternatively or additionally, the RTLS tag 12*a-f* may be programmed to intermittently transmit data to the receivers 13*a*-1 in response to a signal from a magnetic command transmitter (not shown). The magnetic command transmitter may be a portable device, functioning to transmit a 125 kHz signal, in some example embodiments, with a range of approximately 15 feet or less, to one or more of the tags 12a-f. In some examples, the tags 12a-f may be equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as a reference tag 14a-b, may be positioned within and/or about a monitored region. In some examples, the reference tag 14a-b may be configured to transmit a signal that is used to measure the relative phase (e.g., the count of free-running counters) of non-resettable counters within the receivers 13a-1.

One or more (e.g., preferably four or more) receivers 13a-1 are also positioned at predetermined coordinates within and/or around the monitored region. In some examples, the receivers 13a-1 may be connected in a "daisy chain" 19 fashion to advantageously allow for a large number of receivers 13a-1 to be interconnected over a significant monitored region in order to reduce and simplify cabling, provide power, and/or the like. Each of the receivers 13a-1 includes a receiver for receiving transmissions, such as UWB transmissions, and preferably, a packet decoding circuit that extracts a TOA timing pulse train, transmitter ID, packet number, and/or other information that may have been encoded in the tag transmission signal (e.g., material description, personnel information, etc.) and is configured to sense signals transmitted by the RTLS tags 12a-f and one or more reference tags 14a-b.

Each receiver 13a-1 includes a time measuring circuit that measures times of arrival of tag bursts, with respect to its internal counter. The time measuring circuit is phase-locked (e.g., phase differences do not change and therefore respective frequencies are identical) with a common digital reference clock signal distributed via cable connection from a Central Processor/Hub 11 having a central timing reference clock generator. The reference clock signal establishes a common timing reference for the receivers 13a-1. Thus, multiple time measuring circuits of the respective receivers 13a-1 are synchronized in frequency, but not necessarily in phase. While there typically may be a phase offset between any given pair of receivers in the receivers 13a-1, the phase offset is readily determined through use of a reference tag 14a-b. Alternatively or additionally, each receiver may be synchronized wirelessly via virtual synchronization without a dedicated physical timing channel.

In some example embodiments, the receivers 13a-1 are configured to determine various attributes of the received signal. Since measurements are determined at each receiver 13a-1, in a digital format, rather than analog in some examples, signals are transmittable to the central processor/hub 11. Advantageously, because packet data and measurement results can be transferred at high speeds to a receiver memory, the receivers 13a-1 can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 13a-1 to the central processor/hub 11 (e.g., the data cables may enable a transfer speed of 2 Mbps). In some examples, measurement data is transferred to the Central Processor/Hub at regular polling intervals.

As such, the central processor/hub 11 determines or otherwise computes tag location (i.e., object location) by processing TOA measurements relative to multiple data packets detected by the receivers 13a-1. In some example embodiments, the central processor/hub 11 may be configured to resolve the coordinates of a tag using nonlinear optimization techniques.

In some examples, TOA measurements from multiple receivers 13a-1 are processed by the central processor/hub 11 to determine a location of the transmit tag 12a-f by a differential time-of-arrival (DTOA) analysis of the multiple TOAs. The DTOA analysis includes a determination of tag transmit time $t_0$, whereby a TOF, measured as the time elapsed from the estimated tag transmit time $t_0$ to the respective TOA, represents graphically the radii of spheres centered at respective receivers 13a-1. The distance between the surfaces of the respective spheres to the estimated location coordinates ($x_0$, $y_0$, $z_0$) of the transmit tag 12a-f represents the measurement error for each respective TOA, and the minimization of the sum of the squares of the TOA measurement errors from each receiver participating in the DTOA location estimate provides for the location coordinates ($x_0$, $y_0$, $z_0$) of the transmit tag and of that tag's transmit time $t_0$.

In some examples, the system described herein may be referred to as an "over-specified" or "over-determined" system. As such, the central processor/hub 11 may calculate one or more valid (i.e., most correct) locations based on a set of measurements and/or one or more incorrect (i.e., less correct) locations. For example, a location may be calculated that is impossible due the laws of physics or may be an outlier when compared to other calculated locations. As such one or more algorithms or heuristics may be applied to minimize such error.

The starting point for the minimization may be obtained by first doing an area search on a coarse grid of x, y and z over an area defined by the user and followed by a localized steepest descent search. The starting position for this algorithm is fixed, in some examples, at the mean position of all active receivers. No initial area search is needed, and optimization proceeds through the use of a Davidon-Fletcher-Powell (DFP) quasi-Newton algorithm in some examples. In other examples, a steepest descent algorithm may be used.

One such algorithm for error minimization, which may be referred to as a time error minimization algorithm, may be described in Equation 3:

$$\varepsilon = \sum_{j=1}^{N} \left[ [(x-x_j)^2 + (y-y_j)^2 + (z-z_j)^2]^{\frac{1}{2}} - c(t_j - t_0) \right]^2 \quad (3)$$

Where N is the number of receivers, c is the speed of light, ($x_j$, $y_j$, $z_j$) are the coordinates of the $j^{th}$ receiver, $t_j$ is the arrival time at the $j^{th}$ receiver, and $t_0$ is the tag transmit time. The variable $t_0$ represents the time of transmission. Since $t_0$ is not initially known, the arrival times, $t_j$, as well as $t_0$, are related to a common time base, which in some examples, is derived from the arrival times. As a result, differences between the various arrival times have significance for determining location as well as $t_0$.

The optimization algorithm to minimize the error £ in Equation 3 may be the Davidon-Fletcher-Powell (DFP) quasi-Newton algorithm, for example. In some examples, the optimization algorithm to minimize the error £ in Equation 3 may be a steepest descent algorithm. In each case, the algorithms may be seeded with an initial location estimate (x, y, z) that represents the two-dimensional (2D) or three-dimensional (3D) mean of the locations of the receivers 13a-1 that participate in the RTLS location determination.

In some examples, the RTLS system comprises a receiver grid, whereby each of the receivers 13a-1 in the receiver grid keeps a receiver clock that is synchronized, with an initially unknown phase offset, to the other receiver clocks. The phase offset between any receivers may be determined by use of a reference tag that is positioned at a known coordinate position ($x_T$, $y_T$, $z_T$). The phase offset serves to resolve the constant offset between counters within the various receivers 13a-1, as described below.

In further example embodiments, a number N of receivers 13a-1 {$R_j$: j=1, . . . , N} are positioned at known coordinates ($x_{R_j}$, $y_{R_j}$, $z_{R_j}$), which are respectively located at distances $d_{R_j}$ from a reference tag 14a-b, such as given in Equation 4:

$$d_{R_j} = \sqrt{(x_{R_j}-x_T)^2+(y_{R_j}-y_T)^2+(z_{R_j}-z_T)^2} \quad (4)$$

Each receiver $R_j$ utilizes, for example, a synchronous clock signal derived from a common frequency time base, such as a clock generator. Because the receivers are not synchronously reset, an unknown, but constant offset $O_j$ exists for each receiver's internal free running counter. The value of the constant offset $O_j$ is measured in terms of the number of fine resolution count increments (e.g., a number of nanoseconds for a one nanosecond resolution system).

The reference tag is used, in some examples, to calibrate the radio frequency locating system as follows: The reference tag emits a signal burst at an unknown time $\tau_R$. Upon receiving the signal burst from the reference tag, a count $N_{R_j}$ as measured at receiver $R_j$ is given in Equation 5 by:

$$N_{R_j} = \beta \tau_R + O_j + \beta d_{R_j}/c \quad (5)$$

Where c is the speed of light and is the number of fine resolution count increments per unit time (e.g., one per nanosecond). Similarly, each object tag $T_i$ of each object to be located transmits a signal at an unknown time $\tau_i$ to produce a count $N_{i_j}$, as given in Equation 6:

$$N_{i_j} = \beta \tau_i + O_j + \beta d_{i_j}/c \quad (6)$$

At receiver $R_j$ where $d_{i_j}$ the distance between the object tag $T_i$ and the receiver 13a-1 $R_j$. Note that $\tau_i$ is unknown, but has the same constant value for receivers all receivers. Based on the equalities expressed above for receivers $R_j$ and $R_k$ and given the reference tag 14a-b information, phase offsets expressed as differential count values are determined as given in Equations 7a-b:

$$N_{R_j} - N_{R_k} = (O_j - O_k) + \beta\left(\frac{d_{R_j}}{c} - \frac{d_{R_k}}{c}\right) \quad (7a)$$

Or, $$(O_j - O_k) = (N_{R_j} - N_{R_k}) - \beta\left(\frac{d_{R_j}}{c} - \frac{d_{R_k}}{c}\right) = \Delta_{j_k} \quad (7b)$$

Where $\Delta_{jk}$ is constant as long as $d_{Rj}-d_{Rk}$ remains constant, (which means the receivers and reference tag are fixed and there is no multipath situation) and β is the same for each receiver. Note that $\Delta_{j_k}$ is a known quantity, since $N_{R_j}$, $N_{R_k}$, β, $d_{R_j}/c$, and $d_{R_k}/c$ are known. That is, the phase offsets between receivers $R_j$ and $R_k$ may be readily determined based on the reference tag 14a-b transmissions. Thus, again from the above equations, for a tag 12a-f ($T_i$) transmission arriving at receivers $R_j$ and $R_k$, one may deduce the following Equations 8a-b:

$$N_{i_j} - N_{i_k} = (O_j - O_k) + \beta\left(\frac{d_{i_j}}{c} - \frac{d_{i_k}}{c}\right) = \Delta_{j_k} + \beta\left(\frac{d_{i_j}}{c} - \frac{d_{i_k}}{c}\right) \quad (8a)$$

Or, $$d_{i_j} - d_{i_k} = (c/\beta)[N_{i_j} - N_{i_k} - \Delta_{j_k}] \quad (8b)$$

Each arrival time, $t_j$, can be referenced to a particular receiver (receiver "1") as given in Equation 9:

$$t_j = \frac{1}{\beta}(N_j - \Delta_{j1}) \quad (9)$$

The minimization, described in Equation 3, may then be performed over variables (x, y, z, $t_0$) to reach a solution (x', y', z', $t_0$').

Example Receiver Architecture

FIG. 7 illustrates an exemplary receiver, such as receivers 13a-1 of FIG. 6, in a UWB receiver system 900 comprising a UWB receiver that may be configured in accordance with some embodiments of the present invention. In an example embodiment, data packets are transmitted to the receivers 13a-1 and intercepted by UWB antenna 21. A UWB receiver 22 is provided at each receiver 13a-1. The UWB receiver can, for example, be designed in accordance with the system described in commonly-owned U.S. Pat. No. 5,901,172, which is incorporated by reference herein in its entirety.

UWB receiver 22, provided for at receivers 13a-1, allows for an analog signal stream that is digitized, then processed by a UWB TOA and data recovery circuits 24. The analog stream is digitized by up to three or more parallel, concurrent, independent analog-to-digital converters (ADCs) functioning with three distinct threshold levels, resulting in up to three or more digital data streams 23A-C that are sent to the UWB TOA and data recovery circuits 24. In some embodiments, the threshold levels applied to the analog signal stream in the UWB receiver 22 are a function of a signal-to-noise ratio (SNR) present in the communication channel. In some embodiments, the threshold levels are set dynamically as a function of one or more of an antenna preamp gain and an estimated RTLS tag range.

The UWB TOA and data recovery circuits 24 perform as many as three or more parallel, concurrent, identical signal processing functions on the three or more digital data streams 23A-C. The three or more UWB TOA and data recovery circuits 24 may be configured to receive data packets that correspond to RTLS tags 12a-f. The UWB TOA and data recovery circuits 24 may provide for a packet framing and extraction function as part of the data recovery circuit, whereby an RTLS tag 12a-f identification may be extracted. The RTLS identification may be extracted by the TX identification field of the data packet. In some embodiments, the UWB TOA and data recovery circuits 24 are implemented by field programmable gate arrays (FPGAs). The TOA and extracted data packet is sent by TOA line 25 to an arbitrate/buffer function 26.

The arbitrate/buffer function 26 effectively selects the TOA line 25 data provided by the UWB TOA and data recovery circuits 24. The arbitrate/buffer function 26 selects the TOA line 25 that converges to the earliest TOA from the up to three or more TOA and data recovery circuits 24 driven by the digital data stream 23A-C. The arbitrate/buffer function 26 provides for a series of serial messages, or tag message 27, to send to a tag queue function 28, whereby each of the tag messages 27 is identified by an RTLS tag 12a-f and an associated TOA.

The tag queue function 28 provides for a formatting and ordering of the collection of RTLS tag identifiers and TOAs, effectively a first-in first-out (FIFO) memory buffer awaiting a transmission to the central processor/hub 11. Upon a tag queue function 28 trigger, a tag data packet 29 is sent to a formatting and data coding/decoding function 30 that, in turn, repackages the tag data packet 29 and transmits a synchronous tag data packet 30B to the central processor/hub 11.

The synchronous tag data packet 30B transmitted by the formatting and data coding/decoding function 30 to the central processor/hub 11 is synchronized by a 10 MHz receiver clock 40, received from the previous receiver clock in the "daisy chain" 19, and transmitted to the next receiver clock in the "daisy chain" 19 following a synchronous frequency up/down convert. The receiver clock 40 drives a phase-locked loop (PLL) 41, whereby a frequency divider in a feedback loop in conjunction with a voltage-controlled oscillator (VCO) provides for a 100 MHz receiver clock 42-43 that is synchronized in phase to the 10 MHz receiver clock 40. The 100 MHz receiver clock 42 is provided to synchronize all logic blocks in the UWB receiver 13a-1 and to provide for a TOA coarse time 45, sent by line 46 to the TOA and data recovery circuits 24 to be used in the TOA determination. The 100 MHz receiver clock 43 provides for the parallel set of fine detector windows 340, a basis of a set of receiver timing windows used to capture and register pulses transmitted by RTLS tags 12a-f in the TOA determination.

A second function of the formatting and data coding/decoding function 30 is a buffering, reformatting, and repeating of a central processor data 30A-B received and transmitted between the receiver 13a-1 and the central processor/hub 11 via the "daisy chain" 19 receiver network. The central processor data 30A-B received and transmitted from and to the formatting and data coding/decoding function 30 may provide for a series of commands that are decoded at a command decoder 44 to trigger receiver functions. A non-exhaustive list of such functions may include the following: an auto/manual control function 20, a series of telemetry functions 60, and the arbitrate/buffer function 26 to prune a data queue and to manage, delete, and reorder the data queue. The auto/manual control function 20 may be commanded—from manual mode- to report sensor information such as temperature and other telemetry data recorded in the telemetry function 60, and may be commanded to manually adjust one or more of an antenna preamp gain and the previously described threshold levels at the UWB receiver 22.

A power supply 50 may be configured to power the receiver 13a-1 by way of an AC-DC convertor, whereby the AC power may be provided as an input from the central processor/hub 11, shown in FIG. 6. The power supply 50 may be accompanied, in some embodiments, by a power delay circuit 51 to allow for an orderly 'power up' of sequential receivers 13a-1, thus avoiding a power surge and over-current event in the central processor data 30A-B transmission lines.

An advantage, in some examples, to the present embodiment of the UWB receiver system 900 is that packet data and measurement results can be transferred at high speeds to TOA measurement buffers, the arbitrate/buffer function 26, such that the receivers 13a-1 can receive and process tag 12a-f (and corresponding object) locating signals on a nearly continuous basis. That is, multiple UWB data packets can be processed in close succession, thereby allowing the use of hundreds to thousands of tag transmitters.

In some embodiments, data stored in TOA measurement buffers, the arbitrate/buffer function 26, is sent to a central processor/hub 11, shown in FIG. 6, over the central processor data transmission lines 30A-B in response to a specific request from the central processor/hub 11.

In some embodiments, the collection of the central processor data 30A-B transmission lines, connecting a "daisy chain" 19 network of receivers, is comprised of two bi-directional data links. In some embodiments, these data links may be RS422 differential serial links. A network interface may receive command signals from a central processor/hub 11 on one link, for example, to instruct a transfer of the TOA measurement buffer, the arbitrate/buffer function 26, to the central processor/hub 11. Additional commands may include those to adjust UWB receiver 22 operating characteristics such as gain and detection thresholds. The bi-directional data links may also provide for a buffer for data signals linked between "daisy chain" 19 receivers, buffering sequential transmissions between the present and next receiver 13a-1 in a communications chain.

The synchronous frequency up/down convert performed on the 10 MHz receiver clock 40 provides for a driver for the receiver clock 40 transmitted to the next receiver in the "daisy chain" 19. An advantage of this approach, in some examples, is that the 10 MHz receiver clock 40 transmitted to the next receiver—as with the original 10 MHz receiver clock 40—may be made low enough in frequency so that it can be transmitted over low-cost cables (e.g., twisted pair wires). Since timing jitter of the local timing reference signal degrades as the PLL multiplier coefficient is increased, there is a necessary trade-off between frequency and jitter of the local timing reference signal and the frequency of the timing reference clock.

Utilizing a common 10 MHz receiver clock 40 for timing reference, a plurality of local timing reference signals (one in each receiver) can be precisely matched in frequency. Using this approach, additional receivers can be connected without concern for clock loading. Buffer delay is also not an issue since the timing reference clock is used for frequency only and not phase reference.

In some embodiments, the 10 MHz receiver clock 40 may comprise differential signals. The use of differential clock signals is advantageous since they avoid clock duty cycle distortion which can occur with the transmission of relatively high-speed clocks (e.g., >10 MHz) on long cables (e.g., >100 feet).

FIG. 8 illustrates an exemplary embodiment of the UWB TOA and data recovery circuits 950, presented in the UWB receiver system 900 as TOA and data recovery circuits 24, shown in FIG. 7, in accordance with some embodiments of the present invention. In an example embodiment, the UWB TOA data and recovery circuits 950 comprise a windowing/gating function 71, a TOA function 72, a window control clock and data recovery (PLL) function 73, a TOA averaging function 74, a data sync and extract function (1 MHz-2 MHz) 75-76, and a tag data recovery and processing function 77. The UWB TOA and data recovery circuits 950 process the digital data stream 23, shown in FIG. 7, to provide an unpacked data packet and the TOA associated with the RTLS tag to the arbitrate/buffer function 26.

The windowing/gating function 71 and the window control clock and data recovery (PLL) function 73 work as a feedback loop to recover the TX clock and provide for the adjustable timing window function by tracking the RX pulses that comprise the RX pulse train corresponding to the TX pulses in the series of TX pulses in the preamble. The TOA function 72 works in conjunction with the 100 MHz receiver clocks 42-43. The RX clock 42 (201) provides for the TOA coarse time 46. The parallel set of fine detector windows 43 (340) provides for a TOA fine time associated with the RX fine timing window function 300 recording detections by a registration code for the RX pulses that correspond to the sync code TX pulses.

The TOA fine time—the registration code, the disjoint timing windows, as determined by the adjustable timing window function, and the coarse time 46 are sent to the TOA averaging function 74, along with a latch TOA control signal indicating the end of a TOA determination. The TOA averaging function 74 is activated by a calculate TOA trigger 78, whereby the sub-window resolution function is initiated to determine the TOA with sub-window accuracy; that is, with resolution less than 1 nsec. The averaged TOA 80 is then sent to the tag data recovery and processing function 77.

The data sync and extract functions (1 MHz-2 MHz) 75-76 are triggered upon phase lock of the PLL associated with the window control clock and data recovery (PLL) function 73. Phase lock of the PLL is determined by the previously described feedback loop comprising the windowing/gating function 71 and the window control clock and data recovery (PLL) function 73, whereby the feedback loop effectively recovers the TX clock by tracking the RX pulses corresponding to the preamble.

Upon phase lock, whereby the preamble is synchronized to a recovered TX clock, the data packet, beginning with the remainder of the preamble, is extracted and unpacked by the data sync and extract function 75 (76) at a sampling rate of 1 Mhz (2 MHz), and sent to the tag data recovery and processing function 77. In another embodiment, the data sync and extract functions 75-76 are both set to sample the data packet 120 with a sampling rate of 2 MHz, but the two functions may differ by a data format. In one example, the data extracted by function 75 may follow a non-IOS format, where the data extracted by function 76 may follow an IOS format.

The tag data recovery and processing function 77 serves as a data processor for the data extracted by the data sync and extract functions 75-76 and as a communications control function, and also provides for data exchange associated with the arbitrate/buffer function 26, shown in FIG. 7. The data tag recovery and processing function 77 sends the TOA and data packet 120 information from the TOA averaging function 74 and the data sync and extract functions 75, 76, respectively, on TOA line 25 to the arbitrate/buffer function 26, which selects the earliest TOA from the three TOA functions running concurrently in the UWB TOA and data recovery circuits 950, and combines the TOA with the data packet 120 data into a tag message 27 to send to the tag data queue 28. At this point, the tag message 27 comprises at least the average TOA 80 and TX ID extracted from the data packet associated with the given tag transmission. The tag data queue 28, as described previously with respect to FIG. 7, effectively functions as a FIFO buffer for data transmission to the central processor/hub 11.

The tag data recovery and processing function 77 also serves as a controller for the timing of a triggering of the TOA averaging function 74 and a locking/unlocking 79 of the PLL in the window control clock and data recovery (PLL) function 73. The TOA averaging function 74 is initiated by the calculate TOA trigger 78 set by the tag data memory and processing controller 77, whereby the TOA trigger 78 is a function of a sync code detection and a waiting interval associated with the data sync and extract function 75-76. The locking/unlocking 79 of the PLL is a function of a PLL lock indication initiated at the window control clock and data recovery (PLL) function 73, as described previously. And the locking/unlocking 79 of the PLL is reset to unlock the PLL upon detection in the sync and data extract functions 75-76 that the end of the data packet has been reached, that the sampling of the data packet for the given tag transmission is complete.

The TOA averaging function 74 is elucidated by the sub-window resolution function and is initiated by the calculate TOA trigger 78. The TOA averaging function 74 may, in some examples, register a transition as successive RX pulses exhibit a change in detection registration. In another example, a TOA numerical average may be constructed to assign a TOA with sub-window resolution. A TOA numerical average may be constructed, whereby RX pulses 1-5, for example, are assigned a weight equal to 4 nsec greater than the leading edge of the final center disjoint timing window, and RX pulses 6-8 are assigned a weight equal to 3 nsec greater than the leading edge of the final center disjoint timing window. As such, a TOA average is calculated as: 410 nsec+(⅝×14 nsec)+(⅜×13 nsec)=414⅝ nsec.

Exemplary Impact Resistant RTLS Tag Band Case Unit

FIG. 9 illustrates an exemplary impact resistant RTLS tag 1000 with its associated band and case unit 1001 in accordance with some embodiments of the present invention. The band and case unit 1001 is provided to allow the impact resistant RTLS tag 1000 to readily attach and detach from a targeted location object, and to be removed and reinserted to a previously attached target location object. The band and case unit 1001 is designed for a fit that retains and or otherwise limits movement of the impact resistant RTLS tag 1000 when positioned within the band and case unit 1001. In some embodiments, an impact resistant RTLS tag 1000 may have a diameter of between approximately 4.1 cm. to 4.2 cm. In some embodiments, an impact resistant RTLS 1000 unit may have a thickness of between approximately 1.1 cm. to 1.2 cm. In some embodiments, an impact resistant RTLS tag 1000 may comprise a hard and tough plastic housing. In some embodiments, the hard and tough plastic housing may withstand forces above and beyond 100-200 g's. In some examples, the impact resistant RTLS tag 1000 may be shaped to be received in a void defined by equipment, such as shoulder pads. In other examples, the impact resistant RTLS tag 100 may be sized to be small and unobtrusive to a wearer.

Exemplary embodiments of the present invention have been described herein. The invention is not limited to these examples. These examples are presented herein for purposes of illustration, and not limitation. Alternatives (including equivalents, extensions, variations, deviations, etc., of those described herein) may be apparent to persons skilled in the relevant art(s) based in the teachings contained herein. Such alternatives fall within the scope and spirit of the invention.

All publications, patents, and patent applications mentioned in this specification are herein incorporated by reference to the same extent as if each individual publication, patent, or patent application was specifically and individually indicated to be incorporated by reference.

That which is claimed:

1. A miniature and impact resistant real-time location system tag comprising:
    a signal processor configured to generate blink data, the blink data comprising a series of ultra wide band pulses and data;
    a dielectric antenna support defining an antenna cavity;
    a compact high bandwidth antenna seated within the antenna cavity and disposed in electrical communication with the signal processor, the antenna configured to transmit the blink data;
    a radio frequency shield configured to prevent parasitic radiation affecting antenna transmissions;
    a mechanical isolator configured to protect a printed circuit board device; and
    a cup seal configured to prevent the mechanical isolator from entering the radio frequency shield, wherein the mechanical isolator comprises a potting material.

2. The miniature and impact resistant real-time location system tag of claim 1 wherein the radio frequency shield is structured to cover transmitter electronics associated with a printed circuit board.

3. The miniature and impact resistant real-time location system tag of claim 1 wherein the potting material is configured to affix a tag assembly within a protective housing.

4. The miniature and impact resistant real-time location system of claim 3, wherein the protective housing is structured as an oblong protective housing configured to house an oblong tag assembly, the oblong tag assembly comprising an oblong printed circuit board and the compact high bandwidth antenna.

5. The miniature and impact resistant real-time location system tag of claim 1 wherein the cup seal is structured to control a flow of the potting material.

6. The miniature and impact resistant real-time location system of claim 1, wherein the cup seal seals to a printed circuit board over the radio frequency shield.

7. A method for fabricating a miniature and impact resistant real-time location system tag, comprising:
    sealing a cup seal to at least one printed circuit board, the cup seal structured to be sealed over a radio frequency shield and to prevent potting material from entering the radio frequency shield, wherein the at least one printed circuit board is associated with a signal processor, transmitter electronics, and an antenna;
    encasing a tag assembly comprising the at least one printed circuit board and the antenna within a shock absorbing material;
    depositing the potting material to secure the tag assembly within the shock absorbing material; and
    tuning the antenna, whereby the tuning is unaffected by the sealing, the encasing, or the depositing.

8. The method for fabricating a miniature and impact resistant real-time location system tag of claim 7 wherein the shock absorbing material comprises a hard, tough housing.

9. The method for fabricating a miniature and impact resistant real-time location system tag of claim 8 wherein the plastic can absorb a shock greater than 100-200 g's.

10. The method for fabricating a miniature and impact resistant real-time location system tag of claim 7 wherein the radio frequency shield comprises a metal can structured to cover at least the transmitter electronics.

11. The method for fabricating a miniature and impact resistant real-time location system tag of claim 7 wherein the sealing, the encasing, and the depositing results in a predictable distribution of dielectric mechanical and electrical isolators which do not effect a change in a radiation pattern of the antenna.

12. The method for fabricating a miniature and impact resistant real-time location system tag of claim 7 wherein the radio frequency shield is structured to shield the antenna from parasitic radio frequency radiation generated by the transmitter electronics.

13. A miniature and impact resistant real-time location system location tag comprising:
    a signal processor configured to generate blink data, the blink data comprising a series of ultra wide band pulses and data;
    a compact high bandwidth antenna configured to transmit the blink data in association with transmitter electronics;
    a radio frequency shield structured to prevent parasitic radiation from affecting antenna transmissions;
    at least one printed circuit board, wherein the at least one printed circuit board is associated with a signal processor and the antenna, wherein the at least one printed circuit board and the antenna comprise a tag assembly;
    a cup seal sealed around the radio frequency shield to prevent potting material from entering the radio frequency shield; and
    a shock absorbing material encasing the tag assembly wherein the potting material secures the tag assembly within the shock absorbing material.

14. The miniature and impact resistant real-time location system tag of claim 13 wherein the shock absorbing material comprises a hard, tough protective housing.

15. The miniature and impact resistant real-time location system tag of claim 14 wherein the protective housing can absorb a shock greater than 100-200 g's.

16. The miniature and impact resistant real-time location system tag of claim 14, wherein the protective housing is structured as an oblong protective housing configured to house an oblong tag assembly, the oblong tag assembly comprising an oblong printed circuit board and the compact high bandwidth antenna.

17. The miniature and impact resistant real-time location system tag of claim 13 wherein the radio frequency shield comprises a metal can form-fitted to cover at least the transmitter electronics.

18. The miniature and impact resistant real-time location system tag of claim 13 wherein sealing the cup seal around the radio frequency shield comprises sealing the cup seal to the at least one printed circuit board.

19. The miniature and impact resistant real-time location system tag of claim 13 wherein the cup seal, the shock absorbing material, and the potting material provide a predictable distribution of dielectric mechanical and electrical isolators which do not effect a change in a radiation pattern of the compact high bandwidth antenna.

20. A miniature and impact resistant real-time location system location tag comprising:
    at least one printed circuit board comprising a signal processor and transmitter electronics;
    the signal processor configured to generate blink data, the blink data comprising a series of ultra wide band pulses and data;

a compact high bandwidth antenna configured to transmit the blink data in association with the transmitter electronics, wherein the compact high bandwidth antenna is associated with the at least one printed circuit board;

wherein the compact high bandwidth antenna and the at least one printed circuit board comprise a tag assembly;

a shock absorbing housing encasing the tag assembly; and a cup seal structured to seal over the transmitter electronics comprised on a top layer of the at least one printed circuit board to prevent potting material from affecting the transmitter electronics.

21. The miniature and impact resistant real-time location system tag of claim 20, t comprising potting material structured to secure the tag assembly within the shock absorbing housing.

22. The miniature and impact resistant real-time location system tag of claim 20, wherein the at least one printed circuit board comprises a plurality of printed circuit board layers and the transmitter electronics comprises a filter, the filter being embedded within the plurality of printed circuit board layers to prevent parasitic radiation from affecting an antenna radiation pattern.

23. The miniature and impact resistant real-time location system tag of claim 22, further comprising a plurality of printed circuit board planes embedded in one or more of the plurality of printed circuit board layers to further prevent parasitic radiation from affecting the antenna radiation pattern.

24. The miniature and impact resistant real-time location system tag of claim 20, wherein the tag assembly comprises a circular tag assembly structured to improve an antenna radiation pattern produced by the miniature and impact resistant real-time location system tag.

25. The miniature and impact resistant real-time location system tag of claim 24, wherein the improvement to the antenna radiation pattern comprises producing a more uniform antenna radiation pattern.

26. The miniature and impact resistant real-time location system tag of claim 20, the cup seal being structured to seal over an antenna aperture defined by the at least one printed circuit board.

27. The miniature and impact resistant real-time location system tag of claim 24, wherein the shock absorbing housing is structured as a circular protective housing configured to house the circular tag assembly.

28. A miniature and impact resistant real-time location system location tag comprising:

at least one printed circuit board comprising a signal processor and transmitter electronics, wherein the at least one printed circuit board comprises a plurality of printed circuit board layers and the transmitter electronics comprises a filter, the filter being embedded within the plurality of printed circuit board layers to prevent parasitic radiation from affecting an antenna radiation pattern;

a plurality of printed circuit board planes embedded in one or more of the plurality of printed circuit board layers to further prevent parasitic radiation from affecting the antenna radiation pattern;

the signal processor configured to generate blink data, the blink data comprising a series of ultra wide band pulses and data;

a compact high bandwidth antenna configured to transmit the blink data in association with the transmitter electronics, wherein the compact high bandwidth antenna is associated with the at least one printed circuit board;

wherein the compact high bandwidth antenna and the at least one printed circuit board comprise a tag assembly; and a shock absorbing housing encasing the tag assembly.

* * * * *

UNITED STATES PATENT AND TRADEMARK OFFICE
CERTIFICATE OF CORRECTION

PATENT NO. : 9,626,616 B2
APPLICATION NO. : 14/732126
DATED : April 18, 2017
INVENTOR(S) : Edward A. Richley It is certified that error appears in the above-identified patent and that said Letters Patent is hereby corrected as shown below:

In the Claims

Column 31, Claim 21, Line 13 which reads "system tag of claim 20, t comprising potting material structured" should read -- system tag of claim 20, the potting material structured --

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*